United States Patent
Kasaragod et al.

(10) Patent No.: US 10,980,085 B2
(45) Date of Patent: Apr. 13, 2021

(54) SPLIT PREDICTIONS FOR IOT DEVICES

(71) Applicant: Amazon Technologies, Inc., Seattle, WA (US)

(72) Inventors: Sunil Mallya Kasaragod, San Francisco, CA (US); Aran Khanna, Bellevue, WA (US); Calvin Yue-Ren Kuo, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 15/660,857

(22) Filed: Jul. 26, 2017

(65) Prior Publication Data

US 2019/0037638 A1   Jan. 31, 2019

(51) Int. Cl.
| | | |
|---|---|---|
| *G06F 16/30* | (2019.01) | |
| *H04W 84/12* | (2009.01) | |
| *H04L 29/08* | (2006.01) | |
| *H04W 88/02* | (2009.01) | |
| *H04W 88/08* | (2009.01) | |

(52) U.S. Cl.
CPC .......... *H04W 84/12* (2013.01); *H04L 67/10* (2013.01); *H04L 67/12* (2013.01); *H04L 67/18* (2013.01); *H04W 88/02* (2013.01); *H04W 88/08* (2013.01)

(58) Field of Classification Search
CPC .................................................... H04L 67/18
See application file for complete search history.

(56) References Cited

U.S. PATENT DOCUMENTS

| | | | |
|---|---|---|---|
| 9,508,347 B2 | 11/2016 | Wang | |
| 9,563,854 B2 | 2/2017 | Cruz Mota | |
| 2003/0110252 A1 | 6/2003 | Yang-Huffman | |
| 2004/0181534 A1* | 9/2004 | Mortensen | G06F 8/71 |
| 2005/0020886 A1* | 1/2005 | Hutchinson | A61B 5/00 600/300 |
| 2006/0200007 A1* | 9/2006 | Brockway | A61B 5/00 600/300 |
| 2009/0307277 A1* | 12/2009 | Grubov | G06F 11/1451 |

(Continued)

OTHER PUBLICATIONS

U.S. Appl. No. 15/666,491, filed Aug. 1, 2017, Adolfo Bravo Ferreira.

(Continued)

*Primary Examiner* — Mahesh H Dwivedi
(74) *Attorney, Agent, or Firm* — Robert C. Kowert; Kowert, Hood, Munyon, Rankin & Goetzel, P.C.

(57) ABSTRACT

A hub device of a network receives data from edge devices and generates a local result. The hub device also sends the data to a remote provider network and receives a result from the remote provider network, wherein the result is based on the data received from the edge devices. The hub device then generates a response based on the local result or the received result. The hub device may determine to correct the local result based on the result received from the remote provider network, and generate the response based on the corrected result. The hub device may generate an initial response before receiving the result from the provider network. For example, the hub device may determine that the confidence level for the local result is above the threshold level and in response, generate the initial response based on the local result.

18 Claims, 20 Drawing Sheets

(56) References Cited

U.S. PATENT DOCUMENTS

| | | | | |
|---|---|---|---|---|
| 2010/0332149 | A1* | 12/2010 | Scholpp | C02F 1/008 702/25 |
| 2011/0200239 | A1* | 8/2011 | Levine | B01L 3/50215 382/128 |
| 2012/0143020 | A1* | 6/2012 | Bordoley | A61B 5/1114 600/301 |
| 2012/0208161 | A1* | 8/2012 | Takata | G06Q 50/22 434/262 |
| 2012/0289790 | A1* | 11/2012 | Jain | A61B 5/4848 600/301 |
| 2014/0058986 | A1* | 2/2014 | Boss | G06Q 50/00 706/12 |
| 2014/0266684 | A1* | 9/2014 | Poder | G08B 25/003 340/521 |
| 2015/0281401 | A1 | 10/2015 | Le et al. | |
| 2016/0028599 | A1 | 1/2016 | Vasseur et al. | |
| 2016/0050264 | A1 | 2/2016 | Breed et al. | |
| 2016/0072891 | A1* | 3/2016 | Joshi | G06Q 30/0269 370/254 |
| 2016/0111021 | A1* | 4/2016 | Knoche | G09B 7/00 434/262 |
| 2016/0171371 | A1* | 6/2016 | Andrejko | G06F 16/9535 706/50 |
| 2016/0188292 | A1* | 6/2016 | Carter | G06F 3/167 704/257 |
| 2016/0217387 | A1 | 7/2016 | Okanohara et al. | |
| 2016/0239749 | A1 | 8/2016 | Peredriy | |
| 2016/0358095 | A1 | 12/2016 | Dong et al. | |
| 2016/0364539 | A1* | 12/2016 | Reicher | G06K 9/6256 |
| 2018/0032908 | A1 | 2/2018 | Nagaraju et al. | |
| 2018/0285767 | A1 | 10/2018 | Chew | |
| 2018/0330059 | A1* | 11/2018 | Bates | G16H 40/63 |
| 2019/0349266 | A1 | 11/2019 | Johnsson et al. | |

OTHER PUBLICATIONS

U.S. Appl. No. 15/660,859, filed Jul. 26, 2017, Kasaragod, et al.
U.S. Appl. No. 15/660,860, filed Jul. 26, 2017, Kasaragod, et al.

\* cited by examiner

SPLIT PREDICTIONS FOR IOT DEVICES

BACKGROUND

The Internet of Things (IoT) is a phrase given for the interconnection of computing devices scattered around the globe within the existing internet infrastructure. IoT devices may be embedded in a variety of products, such as home appliances, manufacturing devices, printers, automobiles, thermostats, smart traffic lights, video cameras, etc.

In some cases, IoT devices make use of a connection with a hub device to become a part of a local network of devices. The hub device typically is a more powerful device capable of performing more computations and at a faster rate than IoT devices. For example, a house may have a hub device that forms a wireless connection to multiple different sensor IoT devices, such as thermostats for measuring temperatures of different rooms or motion sensors in different rooms. The hub device may receive temperature values or motion data and transmit the temperature values or motion data to one nor more other endpoints. If the hub device is connected to the internet, then the values may be transmitted to a provider network or a user device, such as the user's smart phone.

Some IoT devices are powerful enough to implement a relatively simple data processing model to analyze data and generate a result, such as a prediction. However, the reliability of such a prediction may not be as good as the reliability of a larger model running on a more powerful computing device. For example, a large model implemented by a service provider network or a server computer may use hundreds of millions of parameters, whereas a model running on an IoT device may use only a few hundred thousand. Moreover, the amount and the type of data received by a model at a given IoT device may change over time. For example, a video camera may capture images of novel object or under novel lighting conditions that is was not explicitly trained on. Therefore, even though the model on the camera may have been initially trained based on adequate training data, the model may lose accuracy and become less useful over time.

Figure 1:
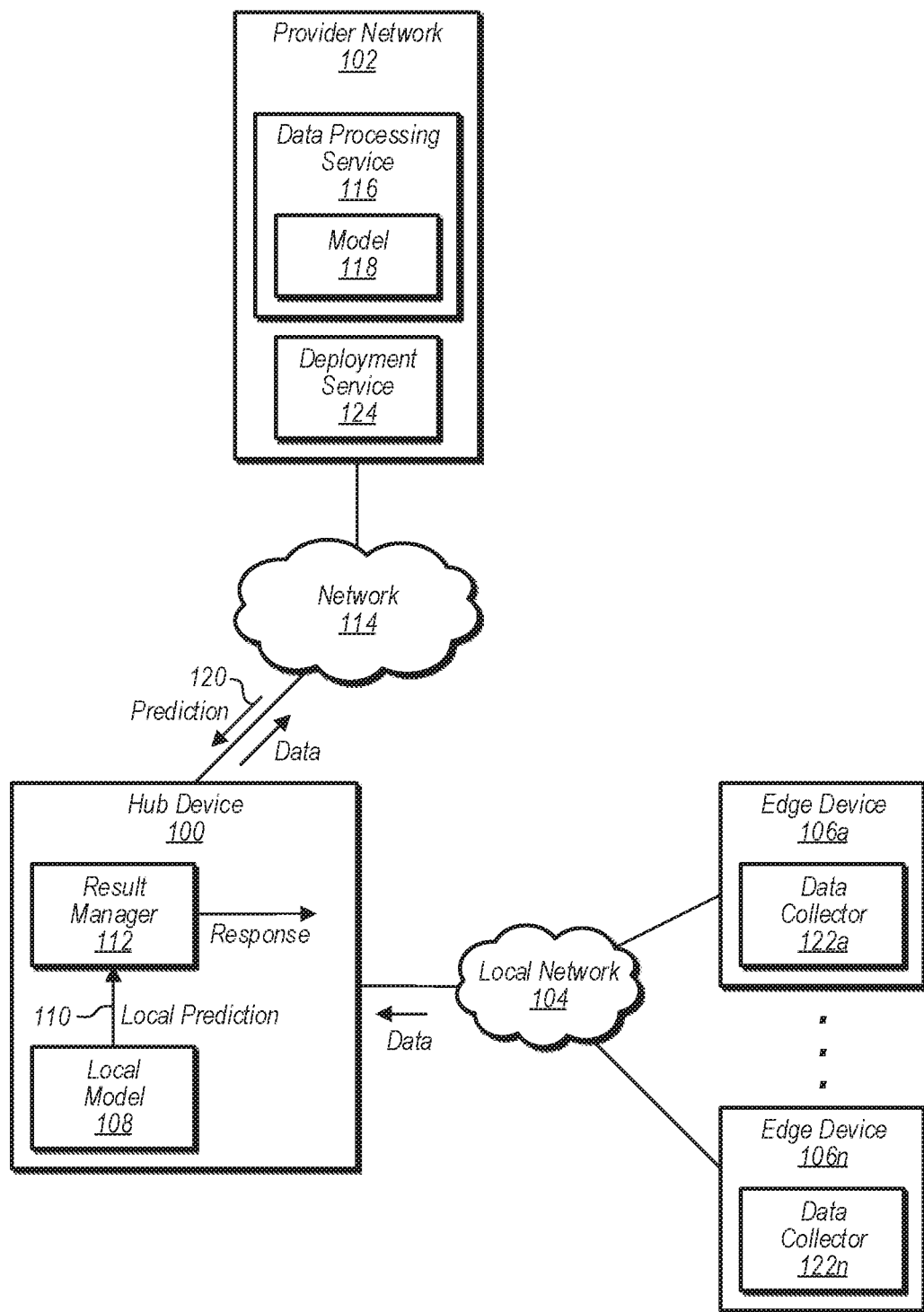
FIG. 1 illustrates a system for implementing a split prediction based on a local model of a hub device and a provider network, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for configuring local networks of internet-connectable devices (e.g., IoT devices) to implement data processing models to rapidly generate local results (e.g., local predictions), while also taking advantage of larger, more accurate data processing models running on more powerful devices (e.g., servers of a provider network) that generate more accurate results based on the same data.

In embodiments, a remote provider network and a local network device (e.g., hub device or edge device) may be used to generate a split prediction. For example, a hub device of a local network may receive data from sensors and process the data using a local model (e.g., data processing model) to generate a local prediction. The sensor data may also be transmitted to a remote provider network, which returns another prediction. If the returned prediction from the provider network is more accurate, then the local prediction may be corrected by the returned prediction.

In some embodiments, a provider network and/or a hub device may update local data models of edge devices based on data collected by the edge devices. For example, a provider network and/or a hub device may periodically receive data from edge devices and generate new updates to local models based on the new data. The provider network and/or a hub device may then deploy the updates to the respective edge devices. In embodiments, entirely new versions of the local models are deployed to replace current models of the respective edge devices.

In embodiments, multiple models may be implemented across multiple respective edge devices (e.g., tier devices) of a network. Some tier devices may implement larger, more accurate models than other tier devices. When a tier device receives data (e.g., from a sensor), the tier device may decide whether to process the data using a local model of the tier device or to send the data on to another tier device that has a larger, more accurate model for processing the data.

As used herein, a model may be any data processing model suitable for processing input data to generate one or more results. For example, a model may include a neural network, deep neural network, static or dynamic neural network, a memory network, and/or any other model architecture suitable for processing the collected data and generating one or more results/predictions. Thus, in embodiments, a model may include any computational model, machine learning model, or artificial intelligence model suitable for processing data and generating one or more results. Moreover, in some embodiments, different devices (e.g., edge devices, tier devices, hub devices, servers, etc.) may include different model architectures and/or be trained based on the same or different training data.

In various embodiments, any suitable security communication protocols may be used to protect data that is being sent between any devices (e.g., edge devices, tier devices, hub devices, servers, etc.) and between devices of different networks (e.g., local networks, cellular networks, provider networks). For example, data may be encrypted using SSL (secure socket layer), TLS (transport layer security), HTTPS (secure hypertext transfer protocol), and/or any other suitable network security protocol.

In embodiments, any of the data collected by a data collector (e.g., sensor) may be converted into training data and used to train models and/or generate updates to models. Thus, analyzing data and/or generating a model based on the analysis may include creating training data and creating modifications and/or updates to the model based on the training data.

The term "prediction" is used herein for various examples. However, in various embodiments and in the figures, any other suitable result (e.g., non-prediction result) may be substituted for a prediction. A result may be an identification based on data received from a sensor. For example, a result may be an identification of a particular person, animal, or object based on analysis of image data using an image classifier. In some embodiments, the word "prediction" may be used instead of "result," and vice versa.

Moreover, a prediction may be a result that identifies a predicted outcome or a predicted future state for an object, environment, person, animal, or anything else that may change state or location over time. For example, a prediction may be a temperature of an area or location a day from the current time. As another example, a prediction may be a location of an object 5 seconds from the current time. In embodiments, predictions may be bounding boxes around certain types of objects in an image or may be generated responses of a system to one or more environmental conditions and/or events.

FIG. 1 illustrates a system for implementing a split prediction based on a local model of a hub device and a provider network, according to some embodiments. A hub device 100, a provider network 102, local network 108, edge devices 106, and any other components depicted in FIG. 1 may be the same as or include one or more of the same components as the hub device, the provider network, local network, edge devices, and any other components depicted in any of FIGS. 2-18, in embodiments. In embodiments, the hub device, provider network, local network, edge devices, tier devices, and other components depicted in any one of FIGS. 1-16 may be the same component as (e.g., same type of component) or include one or more of the same components as a hub device, provider network, local network, edge devices, tier devices, and other components depicted in any other one of FIGS. 1-16.

Although FIGS. 1-16 may describe a single hub device of a local network, in various embodiments any number of hub devices may be used instead of a single hub device. For example, in some embodiments, multiple hub devices may be used as redundant hub devices to add fault-tolerance to the system. If one or more hub devices fail, a remaining one or more hub devices may continue to operate as described. Thus, in embodiments, a hub device may synchronize state with one or more other hub devices (e.g., at periodic intervals or upon detecting an event such as addition of a new hub device or failure of a hub device).

In some embodiments, two or more hub devices may collectively perform the various described operations instead of just one hub device. Thus, two or more hub devices may each perform a particular portion of the described operations (e.g., distributed processing). In other embodiments, a combination of redundant and distributed processing may be implemented via two or more hub devices. In embodiments, the hub device may represent any compute devices described herein, including an edge device or tier device.

In the depicted embodiment, the hub device 100 includes a local model 108 that may receive data from one or more edge devices 106 and process the received data. The local model 108 may include software and/or hardware that performs one or more operations on received data. In embodiments, the one or more operations may include analyzing the data, modifying the data based on the analyzing, and/or generating a result based on the analyzing (e.g., prediction, new data, one or more commands, or some other result). For example, the result may be a local prediction 110. In embodiments, the local prediction may be received by a result manager 112.

In some embodiments, the hub device 100 (e.g., the result manager 112) may also transmit the data received from one or more edge devices 106 to the provider network 102. The data may be transmitted via a wide-area network 114 (e.g., the internet). Thus, the provider network 102 may be considered a remote provider network and may be in another physical location than the hub devices, such as another city, state, or country. In embodiments, the provider network 102 includes a data processing service 116 that includes a model 118 that receives the data from the hub device 112 and processes the received data.

Similar to the local model 108, the model 118 may include software and/or hardware that performs one or more operations on received data. In embodiments, the one or more operations may include analyzing the data, modifying the data based on the analyzing, and/or generating a result based on the analyzing (e.g., prediction, new data, one or more commands, or some other result). For example, the result may be a prediction 120. The data processing service 116 may then transmit the prediction 120 to the hub device 100 via the network 114.

In embodiments, the result manager 112 receives the prediction 120. The result manager 112 may then determine whether to correct the local prediction 110 based on the prediction 120 and/or the local prediction 110. If the result manager 112 determines not to correct the local prediction 110, then the result manager 112 generates a response based on the local prediction 110. For example, the result manager 112 may generate a command or other message that causes the hub device 100 to perform an action. In embodiments, the result manager 112 may send the command or message to an endpoint, such as another edge device of the local network 104 or another computing device outside of the local network 104.

If the result manager 112 determines to correct the local prediction 110, then the result manager 112 corrects the local prediction 110 based on the prediction 120. For example, the result manager 112 may modify the local prediction 110 based on the prediction 120. In some embodiments, to correct the local prediction 110, the result manager 112 replaces the local prediction 110 with the prediction 120.

In embodiments, the result manager 112 then generates a response based on the corrected prediction. For example, the result manager 112 may generate a command or other message that causes the hub device 100 to perform an action. In embodiments, the result manager 112 may send the command or message to an endpoint, such as another edge device of the local network 104 or another computing device outside of the local network 104.

In some embodiments, to determine whether to correct the local prediction 110 based on the prediction 120 and/or the local prediction 110, the result manager 112 may first determine a confidence level for the local prediction 110 and a confidence level for the prediction 120. If the confidence level for the local prediction 110 is lower than the confidence level for the prediction 120, then the result manager 112 may determine to correct the local result. In embodiments, if the confidence level for the local prediction 110 is equal to or greater than the confidence level for the prediction 120, then the result manager 112 may determine not to correct the local result.

In some embodiments, the result manager 112 may determine whether a confidence level for the local prediction 110 is above a threshold level. If so, then the result manager 112 may generate an initial response based on the local prediction 110 before receiving the prediction 120 from the provider network 102 or before determining whether to correct the local prediction 110 based on the prediction 120 and/or the local prediction 110. In some embodiments, the result manager 112 determines a confidence level for the prediction 120 and if the confidence level for the local prediction 110 is lower than the confidence level for the prediction 120, then the result manager 112 determines to correct the local result. In such embodiments, the response based on the corrected result may be different than the initial response.

Thus, in embodiments, the result manager 112 may use the local prediction 110 to generate a response, without waiting to receive the prediction 120. Moreover, the result manager 112 may not correct the local prediction 110 and may not use the prediction 120. For example, after the result manager 112 uses the local prediction 110 to generate a response, then the result manager 112 may ignore the prediction 120 that is received at a later time. In some embodiments, the result manager may use the received prediction 120 to update and/or modify the local model 108 to improve the accuracy of the local model 108 in making predictions based on additional data received at a later time.

In embodiments, the hub device 100 and the edge devices 106 may each be connected to the same local network 104. In various embodiments, one or more of the hub device 100 and the edge devices 106 may be capable of sending data to any other device of the local network 104 via wire and/or via wireless transmission.

As shown in the depicted embodiment, each edge device 110 includes a data collector 122. The data collector 122 may include any suitable device for collecting and/or generating data and sending the data to the hub device 100. For example, the data collector 122 may be an environmental sensor device that detects one or more environmental conditions (e.g., temperature, humidity, etc.) and generates and/or collects environmental data based on the detected environmental conditions. Thus, the generated data may indicate one or more environmental conditions of the edge device 106 or the local network 104.

In embodiments, the data collector 122 may be a sensor or other device that detects performance and/or other operational aspects of the network (e.g., network bandwidth or traffic, power consumption of a data source device, etc.) and generates data based on the detected performance. Thus, the generated data may indicate performance or other operational aspects of the local network and/or the edge device 106. In embodiments, the generated data may be sent to the hub device 100, which may also be sent to the provider network 102.

In some embodiments, the data collected by the data collector 122 is a time-series data set and the data collector 122 performs one or more operations on the time-series data set to generate the data to be transmitted to the hub device 100. For example, the data collector 122 may calculate an average value based on two or more data values of the collected data in order to generate the data to be transmitted.

In embodiments, the provider network 102 may also include a deployment service 124 that generates and/or deploys the local model 108 and/or the result manager 112 to the hub device 100. In some embodiments, the deployment service 124 may generate the local model 108 and/or the result manager 112 based on data that describes one or more performance specifications and/or capabilities of the hub device 100.

By implementing a split prediction as described above, an initial response based on a local prediction may be provided in a shorter amount of time than if the hub device waited for a prediction to be received the provider network. Moreover, by providing the ability to correct the local prediction, the hub device may leverage the more powerful model of the provider network to alter or change the response generated by the hub device. Therefore, the techniques above allow for a faster response based on the local prediction, while also taking advantage of more accurate predictions received from the provider network that may be used to correct the local prediction and to make appropriate adjustments to the response.

In embodiments, an edge device may be any type of computing device that collects data from the environment via one or more sensors. For example, an edge device may be a microphone, camera, temperature sensing device, humidity detector, vibration detector, smoke detector, motion sensor, etc. In embodiments, an edge device may be any type of intelligent IoT device capable of communicating with other computing devices.

Figure 2:
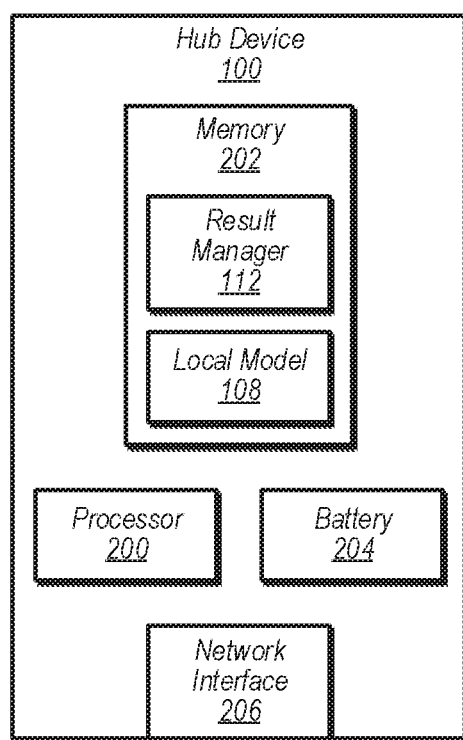
FIG. 2 is a block diagram of an example data hub device that implements a local model and a result manager, according to some embodiments.

FIG. 2 is a block diagram of an example hub device that implements a local model and a result manager, according to some embodiments. In the depicted embodiment, the hub device 100 includes processor 200, a memory 202, a battery 204, and a network interface 206. The memory 202 includes a result manager 112 and a local model 108. The processor 200 may be any suitable processor, such as a graphics processing unit (GPU), GPU accelerator, Field Programmable Gate Array (FPGA), Digital Signal Processor (DSP), DSP accelerator, or application-specific integrated circuit (ASIC). In embodiments, the ASIC may also include the memory 202 and/or any other component of FIG. 2.

In some embodiments, the memory 202 includes executable instructions and the processor 208 executes the instructions in order to implement the result manager 112 and/or the local model 108. In embodiments, the network interface 206 communicatively couples the hub device 100 to the local network. Thus, the hub device 100 may transmit data to and receive data from edge devices via the network interface 206. In embodiments, the network interface 206 may transmit data via a wired or wireless interface.

In some embodiments, the hub device and one or more of its components (e.g., processor and memory) may be relatively lightweight and smaller compared to components (e.g., processor and memory) used by the provider network 102 to implement the data processing service 116 and/or the model 118. For example, the size of one or more memories and/or one or more processors used by one or more servers of the provider network 102 to implement the data processing service 116 and/or the model 118 may be at least an order of magnitude larger than the size of the memory and/or the processor used by the hub device 100. Therefore, in embodiments, the model 118 of the data processing service 116 may produce more accurate results (e.g., predictions) with higher confidence levels, and at a faster rate than the local model 108.

Figure 3:
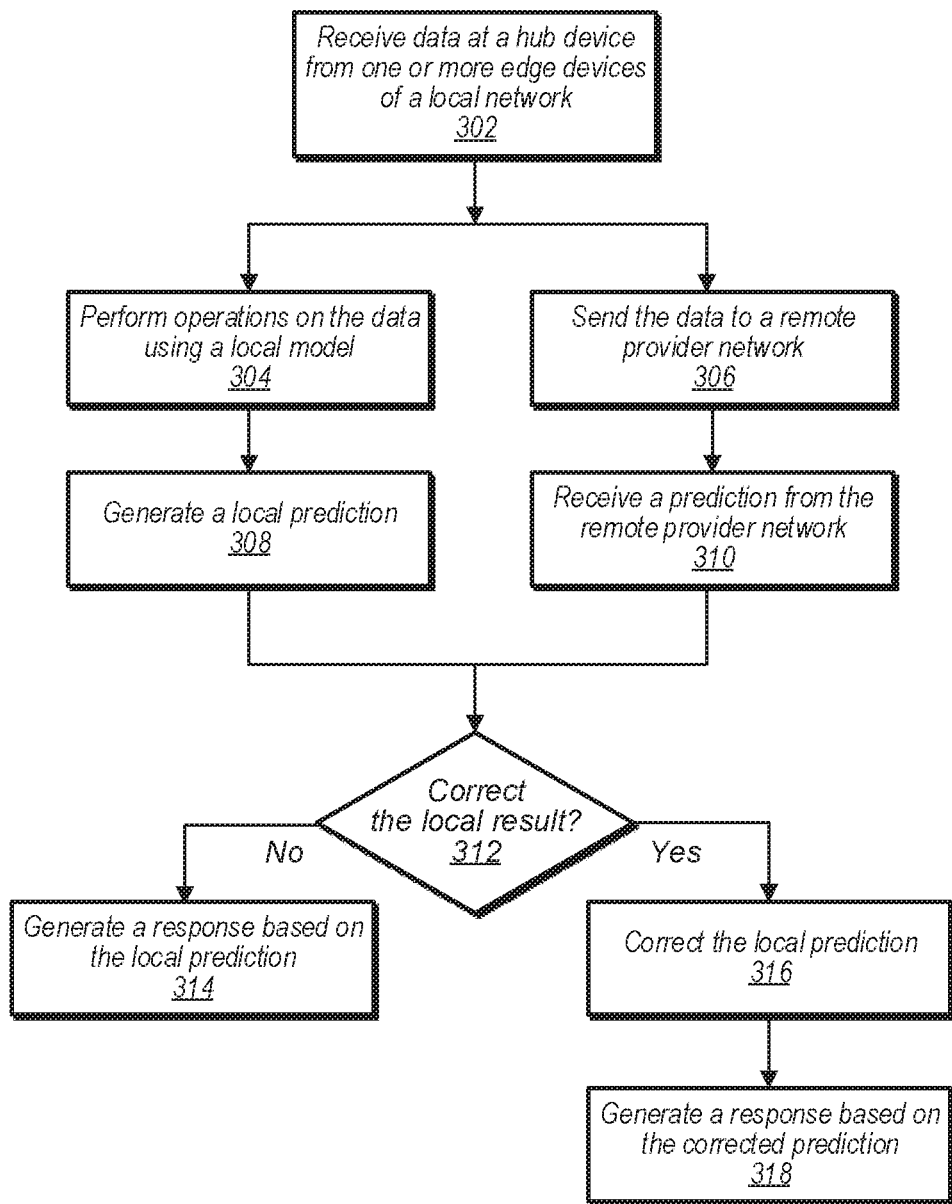
FIG. 3 is a flow diagram that illustrates implementing a split prediction based on a local model of a hub device and a provider network, according to some embodiments.

FIG. 3 is a flow diagram that illustrates implementing a split prediction based on a local model of a hub device and a provider network, according to some embodiments. In embodiments, the hub device may be an edge device, tier device, or any other type of computing device suitable for performing the described functions. At block 302, a hub device receives data from one or more edge devices of a local network. At block 304, the hub device performs one or more operations on the data using a local model of the hub device. At block 306, the hub device also sends the data to a remote provider network.

In embodiments, at least some of the steps of block 304 and/or 308 may occur at approximately the same time or concurrently with block 306 and/or block 310. In embodiments, in response to receiving the data from the one or more edge devices of the local network, the hub device sends the data to the remote provider and sends the data to the local model to begin performing the one or more operations on the data using the local model.

At block 308, the hub device and/or the local model generates a local prediction in response to performing the one or more operations. At block 310, the hub device receives a prediction from the remote provider network, where the prediction is based on the data that was sent to the remote provider network. In embodiments, the hub device sends the local prediction to the result manager in response to the generating of the local prediction and/or the hub device sends the prediction from the provider network to the result manager in response to the receiving the prediction from the provider network. Therefore, the result manager may receive the local prediction or the prediction first, depending on when each is ready first.

At block 312, the hub device (e.g., result manager) determines whether to correct the local prediction to generate a corrected prediction. In embodiments, the result manager determines, based on the received result and the local result, whether to correct the local result to generate a corrected result. The result manager may then generate a response based on the determination. For example, the result manager may determine a confidence level for the local result and determine a confidence level for the result. If the confidence level for the local result is lower than the confidence level for the result, then the result manager may correct the local result to generate the corrected result.

In some embodiments, the received result includes an update for the data processing model of the hub device. Thus, the hub device may update the local model using the update received from the provider network.

If the hub device determines not to correct the local prediction, then at block 314, the hub device generates a response based on the local prediction. If the hub device determines to correct the local prediction, then at block 316, the hub device corrects the local prediction. At block 318, the hub device generates a response based on the corrected prediction.

Figure 4:
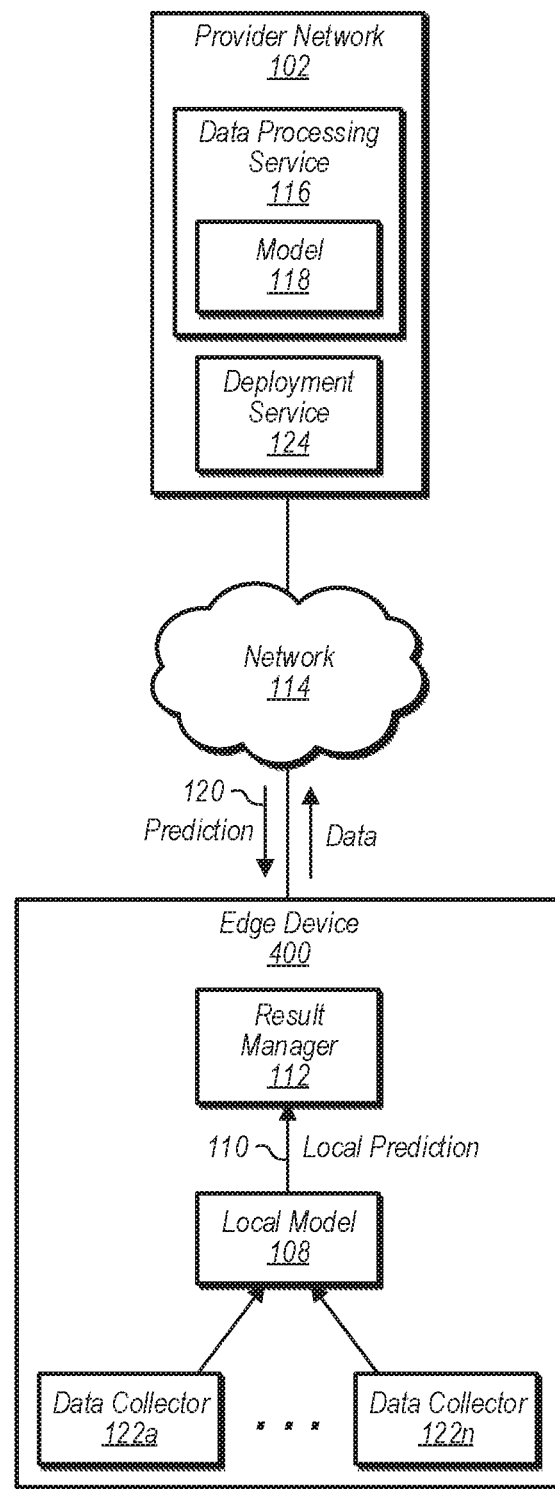
FIG. 4 illustrates a system for implementing a split prediction based on a local model of an edge device and a provider network, according to some embodiments.

FIG. 4 illustrates a system for implementing a split prediction based on a local model of an edge device and a provider network, according to some embodiments. The edge device 400 includes a result manager 112, a local model 108, and one or more data collectors 122. The provider network 102 includes the data processing service 116, which includes the model 118. The provider network 102 also includes the deployment service 124.

In the depicted embodiment, the edge device 400 includes a local model 108 that may receive data from one or more data collectors 122 (e.g., sensors) and process the received data. The local model 108 may include software and/or hardware that performs one or more operations on received data. In embodiments, the one or more operations may include analyzing the data, modifying the data based on the analyzing, and/or generating a result based on the analyzing (e.g., prediction, new data, one or more commands, or some other result). For example, the result may be a local prediction 110. In embodiments, the local prediction 110 may be received by a result manager 112.

In some embodiments, the edge device 400 (e.g., the result manager 112) may also transmit the data received from the one or more data collectors 122 to the provider network 102. The data may be transmitted via a wide-area network 114 (e.g., the internet). Thus, the provider network 102 may be considered a remote provider network and may be in another physical location than the edge device, such as another city, state, or country. In embodiments, the data processing service 116 and/or the model 118 receives the data sent from the hub device 112 and processes the received data.

As described above, the model 118 may include software and/or hardware that performs one or more operations on received data. The one or more operations may include analyzing the data, modifying the data based on the analyzing, and/or generating a result based on the analyzing (e.g., prediction 120, new data, one or more commands, or some other result). The data processing service 116 may then transmit the prediction 120 to the edge device 400 via the network 114.

In embodiments, the result manager 112 receives the prediction 120. The result manager 112 may then determine whether to correct the local prediction 110 based on the prediction 120 and/or the local prediction 110. If the result manager 112 determines not to correct the local prediction 110, then the result manager 112 generates a response based on the local prediction 110. For example, the result manager 112 may generate a command or other message that causes the edge device 400 to perform an action. In embodiments, the result manager 112 may send the command or message to an endpoint, such as another edge device of the local network 104, another computing device outside of the local network 104, or another endpoint within the edge device 400.

If the result manager 112 determines to correct the local prediction 110, then the result manager 112 corrects the local prediction 110 based on the prediction 120. For example, the result manager 112 may modify the local prediction 110 based on the prediction 120. In some embodiments, to correct the local prediction 110, the result manager 112 replaces the local prediction 110 with the prediction 120.

In embodiments, the result manager 112 then generates a response based on the corrected prediction. For example, the result manager 112 may generate a command or other message that causes the edge device 400 to perform an action. In embodiments, the result manager 112 may send the command or message to an endpoint, such as another edge device of the local network 104, another computing device outside of the local network 104, or an endpoint within the edge device 400.

In some embodiments, to determine whether to correct the local prediction 110 based on the prediction 120 and/or the local prediction 110, the result manager 112 may first determine a confidence level for the local prediction 110 and a confidence level for the prediction 120. If the confidence level for the local prediction 110 is lower than the confidence level for the prediction 120, then the result manager 112 may determine to correct the local result. In embodiments, if the confidence level for the local prediction 110 is equal to or greater than the confidence level for the prediction 120, then the result manager 112 may determine not to correct the local result.

In some embodiments, the result manager 112 may determine whether a confidence level for the local prediction 110 is above a threshold level. If so, then the result manager 112 may generate an initial response based on the local prediction 110 before receiving the prediction 120 from the provider network 102 or before determining whether to correct the local prediction 110 based on the prediction 120 and/or the local prediction 110. In some embodiments, the result manager 112 determines a confidence level for the prediction 120 and if the confidence level for the local prediction 110 is lower than the confidence level for the prediction 120, then the result manager 112 determines to correct the local result. In such embodiments, the response based on the corrected result may be different than the initial response.

In embodiments, the edge device 400 and one or more other edge devices 106 may each be connected to the same local network. In some embodiments, at least some of the data received by the data model is received from the one or more other edge devices 106. In various embodiments, one or more of the edge device 400 and the edge devices 106 may be capable of sending data to any other device of the local network 104 via wire and/or via wireless transmission.

In embodiments, a data collector 122 may include any suitable device for collecting and/or generating data. For example, a data collector 122 may be an environmental sensor device that detects one or more environmental conditions (e.g., temperature, humidity, etc.) and generates and/or collects environmental data based on the detected environmental conditions. Thus, the generated data may indicate one or more environmental conditions of the edge device 106 or the local network 104.

In embodiments, a data collector 122 may be a sensor or other device that detects performance and/or other operational aspects of the edge device 400 (e.g., network bandwidth or traffic, power consumption of an edge device, etc.) and generates data based on the detected performance. Thus, the generated data may indicate performance or other operational aspects of the edge device 400. In embodiments, the generated data may be sent to the provider network 102.

In some embodiments, the data collected by a data collector 122 is a time-series data set and the data collector 122 performs one or more operations on the time-series data set to generate the data to be sent to the local model 108. For example, the data collector 122 may calculate an average value based on two or more data values of the collected data in order to generate the data to be sent.

In embodiments, the provider network 102 may also include a deployment service 124 that generates and/or deploys the local model 108 and/or the result manager 112 to the edge device 400. In some embodiments, the deployment service 124 may generate the local model 108 and/or the result manager 112 based on data that describes one or more performance specifications and/or capabilities of the edge device 400.

By implementing a split prediction as described above, an initial response based on a local prediction may be provided in a shorter amount of time than if the edge device waited for a prediction to be received the provider network. Moreover, by providing the ability to correct the local prediction, the edge device may leverage the more powerful model (e.g., using a larger number of parameters and/or compute power) of the provider network to alter or change the response generated by the edge device. Therefore, the techniques above allow for a faster response based on the local prediction, while also taking advantage of more accurate predictions received from the provider network that may be used to correct the local prediction and to make appropriate adjustments to the response.

Figure 5A:
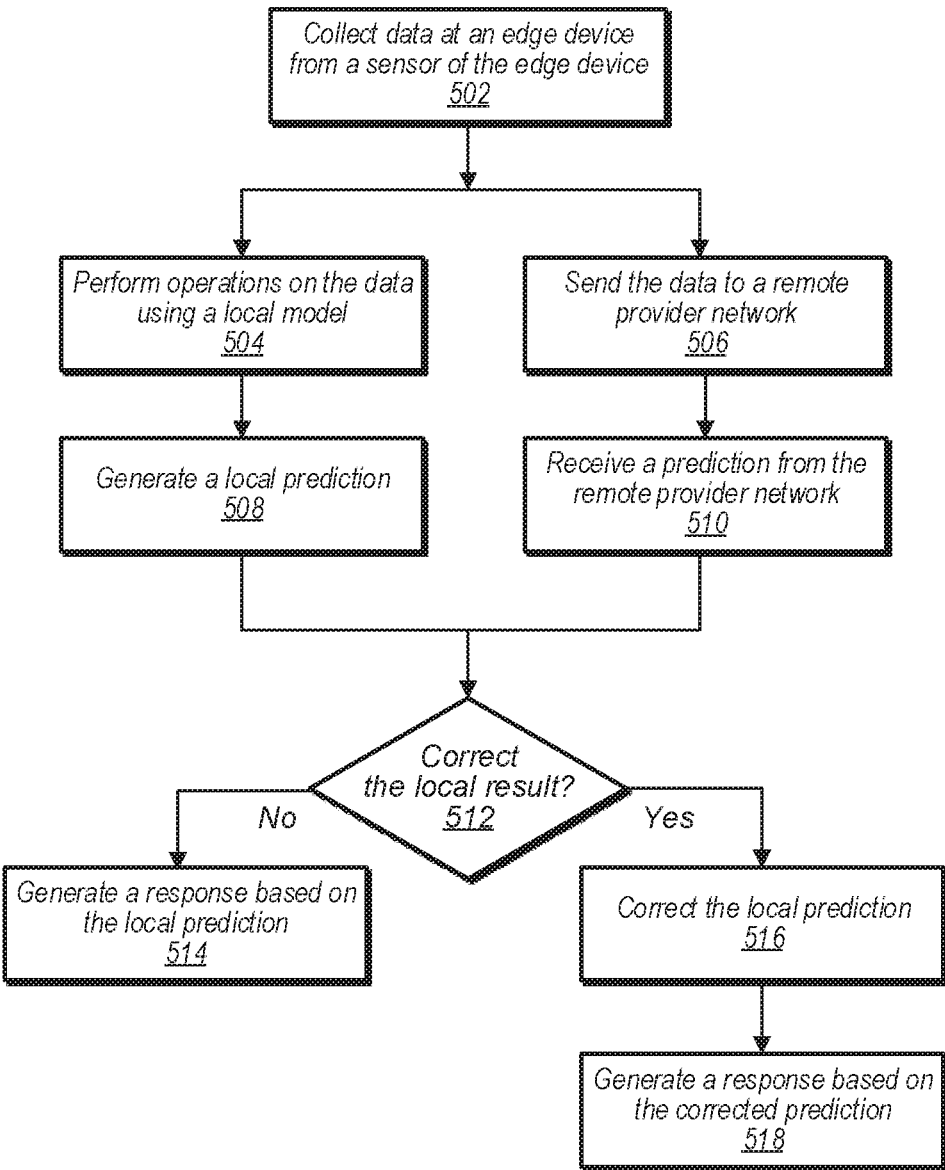
FIG. 5A is a flow diagram that illustrates implementing a split prediction based on a local model of an edge device and a provider network, according to some embodiments.

FIG. 5A is a flow diagram that illustrates implementing a split prediction based on a local model of an edge device and a provider network, according to some embodiments. At block 502, an edge device receives data from one or more data collectors. At block 504, the edge device performs one or more operations on the data using a local model of the edge device. At block 506, the edge device also sends the data to a remote provider network.

In embodiments, at least some of the steps of block 504 and/or 508 may occur at approximately the same time or concurrently with block 506 and/or block 510. In embodiments, in response to receiving the data from the one or more data collectors, the edge device sends the data to the remote provider and sends the data to the local model to begin performing the one or more operations on the data using the local model.

At block 508, the edge device and/or the local model generates a local prediction in response to performing the one or more operations. At block 510, the edge device receives a prediction from the remote provider network, where the prediction is based on the data that was sent to the remote provider network. In embodiments, the edge device sends the local prediction to the result manager in response to the generating of the local prediction and/or the edge device sends the prediction from the provider network to the result manager in response to the receiving the prediction from the provider network. Therefore, the result manager may receive the local prediction or the prediction first, depending on when each is ready first.

At block 512, the edge device (e.g., result manager) determines whether to correct the local prediction to generate a corrected prediction. If the edge device determines not to correct the local prediction, then at block 514, the edge device generates a response based on the local prediction. If the edge device determines to correct the local prediction, then at block 516, the edge device corrects the local prediction. At block 518, the edge device generates a response based on the corrected prediction.

Figure 5B:
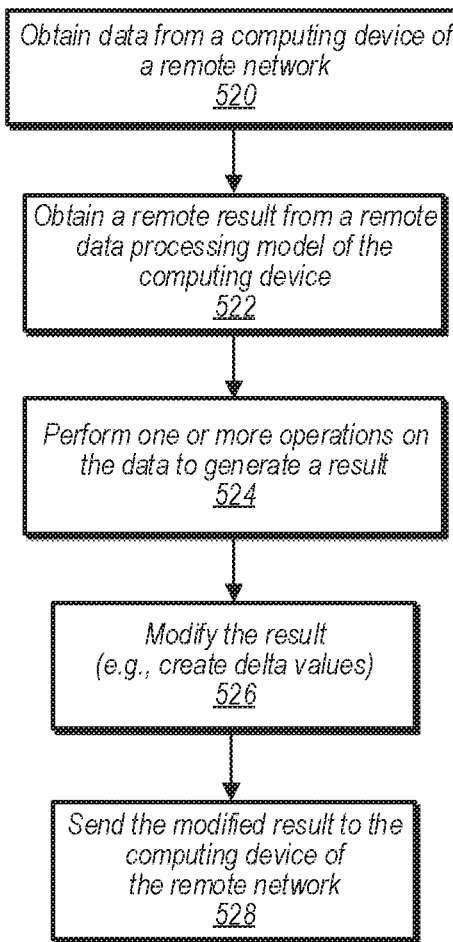
FIG. 5B is a flow diagram that illustrates a data processing service of a provider network that generates and transmits a result to a computing device of a remote network, according to some embodiments.

FIG. 5B is a flow diagram that illustrates a data processing service of a provider network that generates and transmits a result to a computing device of a remote network, according to some embodiments. In embodiments, the computing device may be an edge device, hub device, tier device, or any other computing device suitable for performing the described functions.

At block 520, the data processing service obtains data from a computing device of a remote network (e.g., edge device 400 or hub device 100). In embodiments, the data may be collected from one or more data collectors (e.g., sensors) of the computing device. In embodiments, an edge device 400 may be considered a computing device of a remote network, even though the edge device 400 may be the only edge device of the remote network.

At block 522, the data processing service obtains a remote result from a remote data processing model of the computing device, wherein the remote result is based on the data. Thus, the data processing model of the computing device may have generated the remote result and transmitted it to the data processing service.

At block 524, the data processing service performs, by a data processing model of the data processing service, one or more operations on the data to generate a result. At block 526, the data processing service modifies the result. For example, the data processing service may modify the result based on one or more differences between the remote result and the result. In some embodiments, the data processing service may modify the result based on a difference between a confidence level for the remote result and a confidence level for the result.

In embodiments, the result may be modified by determining one or more delta values based at least on differences between the remote result and the result and then modifying the result by replacing the result with the one or more delta values (e.g., with a gradient or incremental changes). In embodiments, the size of the one or more delta values transmitted to the computing device of the remote network is smaller than a size of the result that was replaced by the one or more delta values. Therefore, less bandwidth is used when sending the result to the computing device of the remote network, optimizing the transmission of the result.

In some embodiments, the data processing service may also generate an update for the remote data processing model of the computing device based on the remote result and the result and then transmit the update for the remote data processing model to the computing device of the remote network. The computing device may then update the remote data processing model using the update. For example, the data processing service may determine one or more changes that need to be made to increase accuracy of the remote data processing model, based on one or more differences between the remote result and the result. Only the changes to the remote data processing model are sent, instead of a new remote data processing model. Thus, less bandwidth is used to update the remote data processing model.

Figure 6:
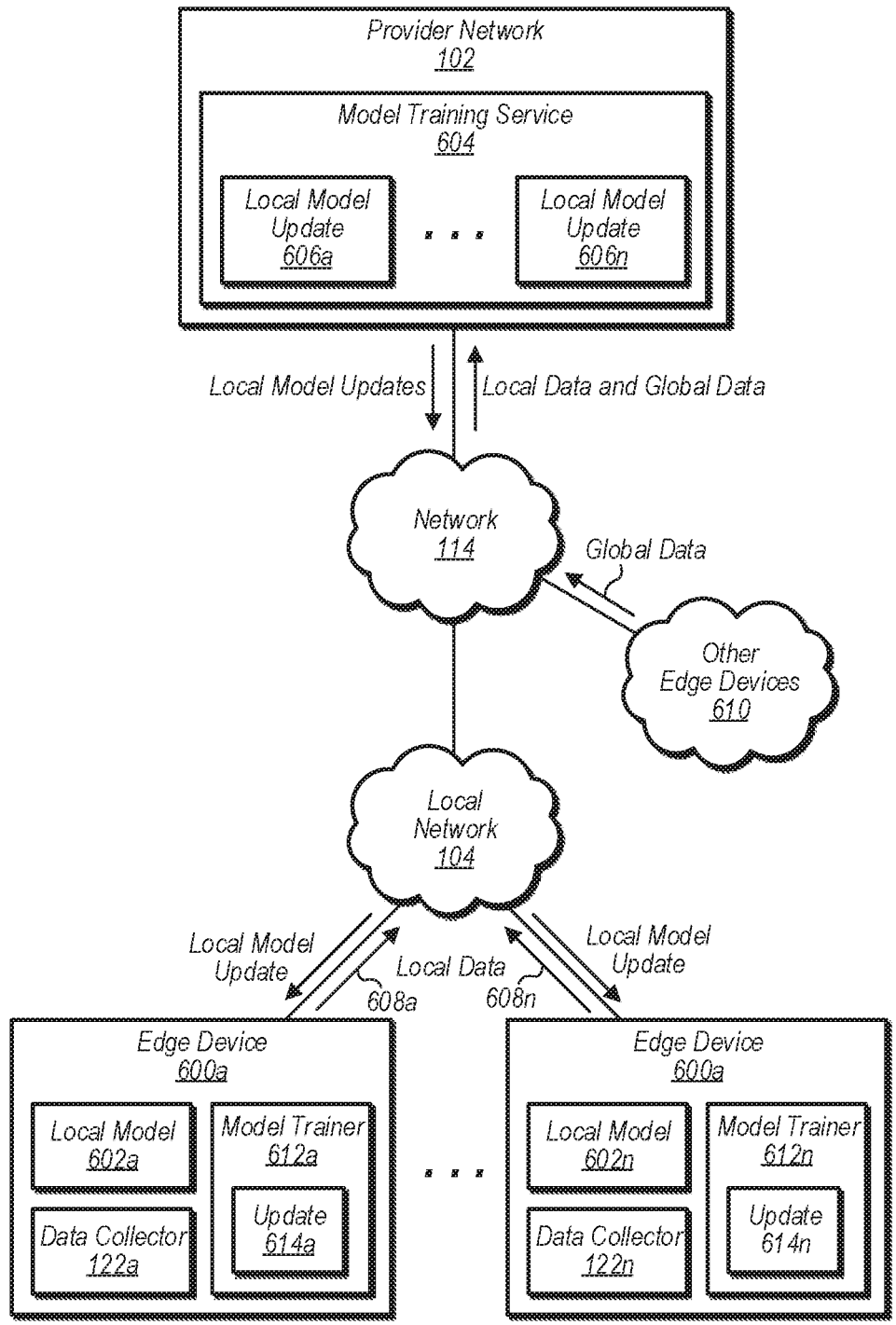
FIG. 6 illustrates a system for updating models for edge devices by a provider network, according to some embodiments.

FIG. 6 illustrates a system for updating models for edge devices by a provider network, according to some embodiments. In the depicted embodiment, the edge devices 600 are connected to a local network 104 and include a local model 602 and a data collector 122. The provider network 102 includes a model training service 604 that generates one or more model updates 606.

One or more of the edge devices may collect data from a respective data collector 122 and send the data to the provider network via the local network 104 and the network 114. For example, the edge device 600a may collect and send the data 608a to the provider network 102 and the edge device 600n may collect and send the data 608n to the provider network 102.

In embodiments, the model training service 604 of the provider network 102 may receive the data 608 from one or more of the edge devices 600. For example, the model training service 604 may receive the data 608a and data 608n. The model training service 604 may then analyze the received data. The model training service 604 may then generate a local model update 606a to the local model 602a based on the analysis of the data 608a and generate a local model update 606n to the local model 602n based on the analysis of the data 608n.

In embodiments, the local model update 606a is configured to update the local model 602a and the local model update 606n is configured to update the local model 602n. For example, each of the local model updates 606a, 606n may include computer-executable instructions and/or other data that is configured be loaded into memory and to update the corresponding local models 602a, 602n when executed by a processor of the respective edge device 600a, 600n.

In response to the generating of the local model updates 606a, 606n, the model training service 604 may deploy the local model updates 606a, 606n to the local network 104 and/or deploy the local model updates 606a, 606n to the respective edge device 600a, 600n. Although the above example includes only two model updates, any other number of local model updates 606 may be generated and deployed by the model training service 604 to respective edge devices 600 based on received data, in the manner described above.

In embodiments, one or more of the model updates may include one or more new versions of the respective local models configured to replace the respective local models. Thus, instead of just modifying an existing local model, in some cases it is replaced by a different model that is a more recent version.

In some embodiments, one or more of the edge devices 600 may include a model trainer 612 that generates a local model update 614 and applies the local model update 614 to update the local model 602. For example, an edge device 600 may receive data from the data collector 122 and analyze the data. The edge device 600 may then generate an update 614 to the local model 602 based on the analysis of the data, wherein the update 614 is configured to update the local model 602. The model trainer 612 may then apply the update 614 to the local model 602.

In embodiments, the edge device 600 may also send the data received from the data collector 122 to the model training service 604. The edge device 600 may then receive another local model update 606 from the model training service, wherein the local model update 606 is based on the data received from the data collector 122. The edge device 600 and/or the model trainer 612 may then apply the local model update 606 to the local model 602.

In some embodiments, the local model update 606 is a new version of the local model, and the edge device 600 and/or the model trainer 612 replaces the local model 602 with the new version of the local model. In embodiments, the edge device 600 and/or the model trainer 612 receives initial data from the data collector 122 and analyzes the initial data to initially generate the local model 602. In other embodiments, the edge device 600 initially receives the local model 602 from the model training service of the provider network 102.

In embodiments, the model trainer 612 receives global data from the model training service 604, wherein the global data is based on data collected by one or more other edge devices of one or more other remote edge devices 610. The model trainer 612 may then analyze the global data and generate the update 614 based on the analysis of the global data.

In some embodiments, the local model update 606 received from the model training service is based on both the data received from the data collector 122 and global data collected by one or more other edge devices of one or more other edge devices 610. For example, the model training service 604 may generate the local model update 606 based on the data received from the data collector 122 and global data collected by one or more other edge devices of one or more other edge devices 610.

In embodiments, the model trainer 612 and/or the edge device 600 receives, on a periodic basis, an additional local model update 606 from the model training service 604 of the provider network 102, wherein the additional local model update 606 is based at least on additional data collected by the data collector 122 and sent to the model training service 604 of the provider network 102 on a periodic basis. For example, once a day the model training service 604 may collect additional data using the data collector 122 and send the additional data to the model training service 604 of the provider network 102. In response the model training service 604 generates an additional local model update 606 and sends it to the model trainer 612 and/or the edge device 600.

By using the above techniques, an edge device may update the local model by applying the update 614 to improve accuracy of the local model. Then, another local model update 606 may be received from the model training service and the edge device may apply the local model update 606 to improve the accuracy of the local model even more. This is possible because the model training service 604 may use a larger model and/or use additional training data to generate the local model update 606 that is not available to the edge device.

As discussed above, the model training service may initially create and deploy a given local model to the remote network and/or edge device. For example, the model training service may generate one or more of the local models for the one or more of the respective edge devices of the remote network and then deploy the one or more local models to the remote network. In embodiments, the model training service may generate a given local model based on topology data or any other data received from a corresponding edge device that will be implementing the local model.

In embodiments, the model training service may receive global data from one or more other edge devices of one or more other edge devices 610, analyze the global data, and generate the one or more updates to local models based on the analysis of the received data and the analysis of the global data. The updates may then be deployed to respective edge devices. For example, images captured by cameras from many different homes and/or businesses may be used to enhance training data that is used for generation of local models.

In some embodiments, the model training service may apply different weights to at least some of the received data and at least some of the global data during the analysis of the received data and the analysis of the global data. For example, a higher weight may be applied to the received data from the local network than to the global data during the analysis of the received data and the analysis of the global data. Thus, an amount of data received by the model training service from the local network may have a larger impact on the training of a local model than the same amount of global data received by the model training service.

Conversely, in some embodiments, a higher weight may be applied to the global data than to the received data from the local network during the analysis of the received data and the analysis of the global data. Thus, an amount of global data received by the model training service may have a larger impact on the training of a local model than the same amount of data received by the model training service from the local network.

In embodiments, analysis of data from two or more different edge devices may be used to generate an update for a local model of a particular edge device. Thus, one local model of a particular edge device may be updated and/or trained not only based on data from the particular edge device, but also based on data from one or more other edge devices of the same local network and/or other networks. In other words, the generating of at least one of the updates to a particular local data processing model may be based on analysis of a portion of the data received by the model training service from two or more different edge devices.

In some embodiments, the model training service may generate and deploy one or more additional updates for one or more of the respective local data processing models to one or more respective edge devices on a periodic basis and/or in response to a triggering event. For example, updates may be generated based on received data and deployed to edge devices on an hourly, daily, or weekly basis, or in response to the model training service receiving a command to update one or more of the local models of respective edge devices.

Figure 7:
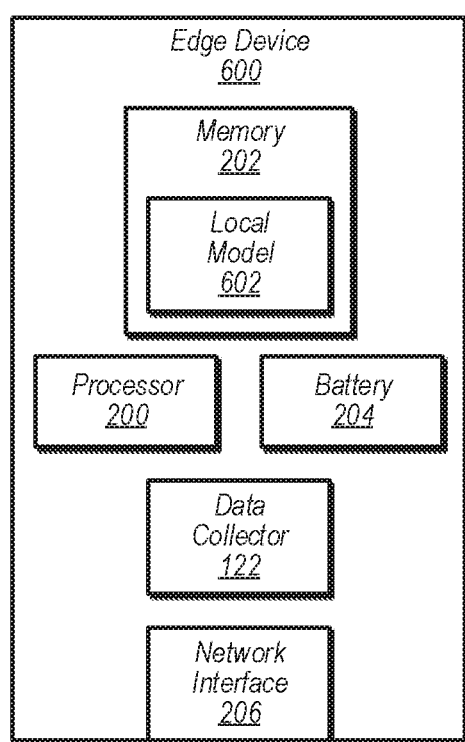
FIG. 7 is a block diagram of an edge device that implements a local model, according to some embodiments.

FIG. 7 is a block diagram of an edge device that implements a local model, according to some embodiments. In the depicted embodiment, the edge device 600 includes processor 200, a memory 202, a battery 204, and a network interface 206. The memory 202 includes a local model 602.

In some embodiments, the memory 202 includes executable instructions and the processor 208 executes the instructions in order to implement the local model 108. In embodiments, the network interface 206 communicatively couples the edge device 600 to the local network. Thus, the edge device 600 transmits data to the hub device 100 via the network interface 206. In embodiments, the network interface 206 may transmit data via a wired or wireless interface.

In some embodiments, the edge device and one or more of its components (e.g., processor and memory) may be relatively lightweight and smaller compared to components (e.g., processor and memory) used by the provider network to implement the model training service. For example, the size of one or more memories and/or one or more processors used by one or more servers of the provider network to implement the model training service may be at least an order of magnitude larger than the size of the memory and/or the processor used by the edge device.

Figure 8A:
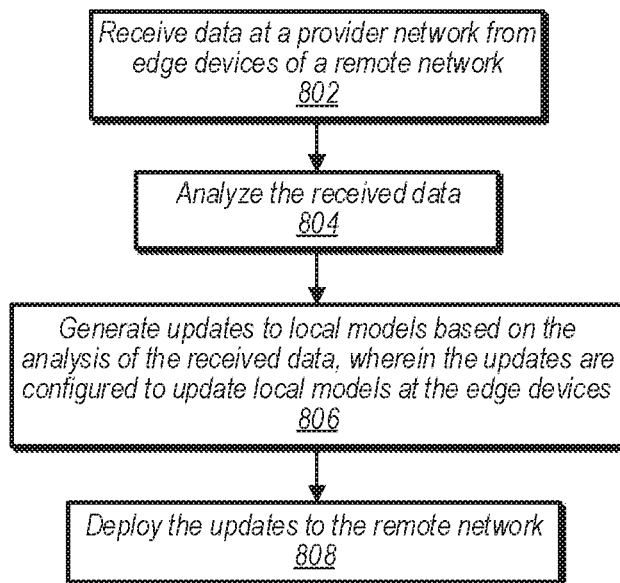
FIG. 8A is a flow diagram that illustrates updating models for edge devices by a provider network, according to some embodiments.

FIG. 8A is a flow diagram that illustrates updating models for edge devices by a provider network, according to some embodiments. At block 802, a model training service of a provider network receives data from one or more respective edge devices of a remote network. At block 804, the model training service analyzes the received data.

At block 806, the model training service generates updates to one or more local models based on the analysis of the received data, wherein the one or more updates are configured to update the one or more local models at the respective edge devices. In embodiments, the model training service generates the one or more updates to one or more respective local models at the respective edge devices based on a state of the one or more respective edge devices and/or a state of the remote network. The state of an edge device may include one or more performance and/or hardware specifications of the edge device, (e.g., amount of free memory, processor speed, etc.), a health status of the edge device, or any other suitable parameters for representing state of an edge device. In some embodiments, the edge device or other device may provide one or more configuration files to the model training service that describe the state of the edge device. The state of the remote network may be available bandwidth between any of the computing devices of the network, the state of one or more of the computing devices of the network, or any other suitable parameters for representing state of a network. At block 808, the model training service deploys the one or more updates to the remote network and/or to the respective edge devices.

Figure 8B:
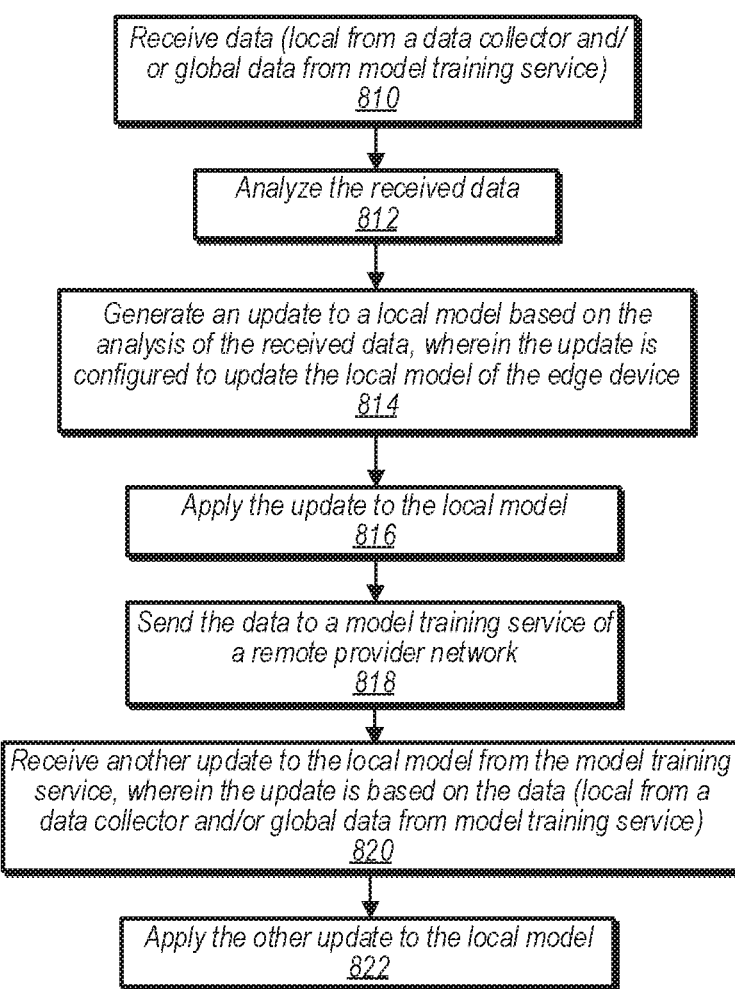
FIG. 8B is a flow diagram that illustrates updating a local model of an edge device, according to some embodiments.

FIG. 8B is a flow diagram that illustrates updating a local model of an edge device, according to some embodiments. At block 810, an edge device (e.g., model trainer) receives data from a data collector. In embodiments, at least some of the data received by the edge device may be global data from one or more other edge devices at other locations. For example a provider network may collect the global data and send it to the edge device. At block 812, the edge device analyzes the received data. At block 814, the edge device generates an update to a local model based on the analyses of the received data, wherein the update is configured to update the local model of the edge device.

At block 816, the edge device applies the update to the local model. At block 818, the edge device sends the data to a model training service of a remote provider network. In embodiments, the edge device may send the data to the model training service and receive the data from the data collector at approximately the same time and/or concurrently. At block 820, the edge receives another local model update to the local model from the model training service, wherein the other local model update is based on the data and/or global data from one or more other edge devices at other locations. At block 822, the edge device applies the other local model update to the local model. In embodiments, the other update may include one or more changes (e.g., deltas or gradient values) to the update that was generated by the edge device.

Figure 9:
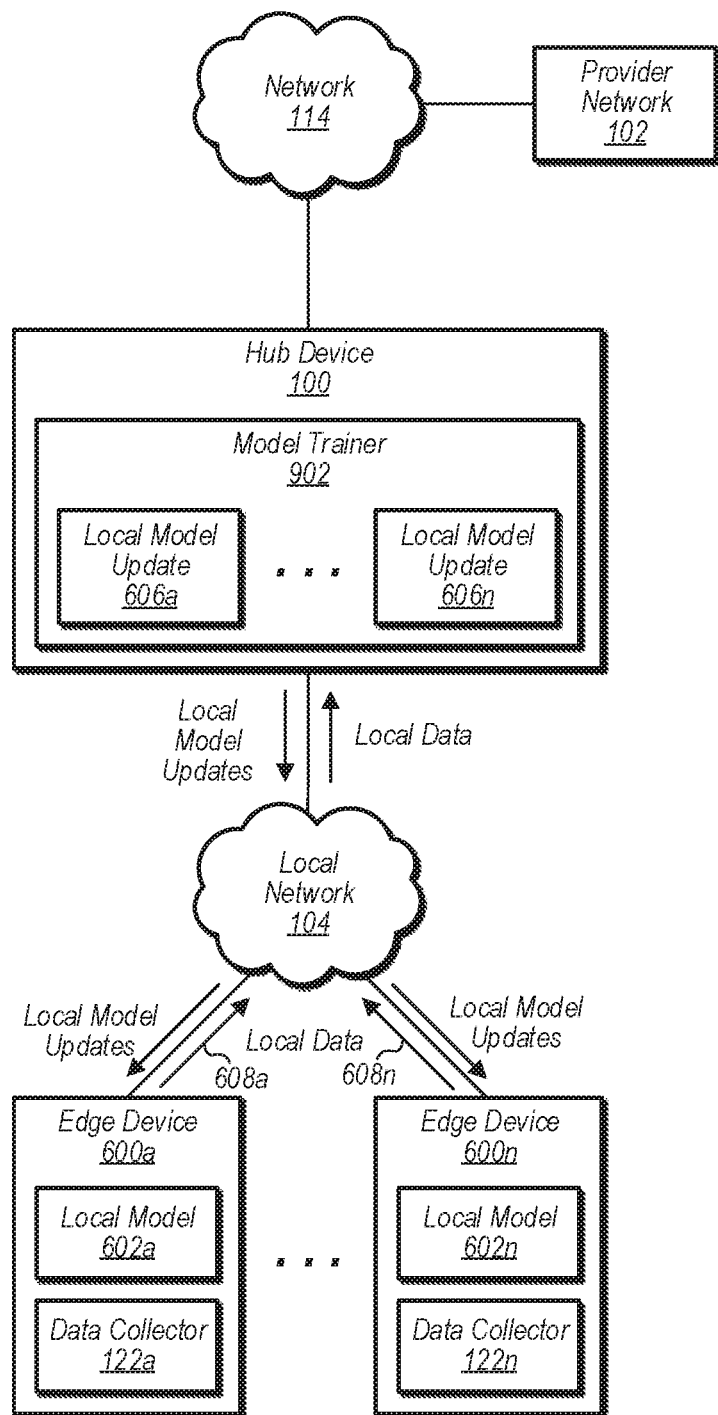
FIG. 9 illustrates a system for updating models for edge devices by a hub device, according to some embodiments.

FIG. 9 illustrates a system for updating models for edge devices by a hub device, according to some embodiments. In the depicted embodiment, the edge devices 600 are connected to a local network 104 and include a local model 602 and a data collector 122. The hub device 100 is connected to the local network 104 and includes a model trainer 902 that generates one or more model updates 606.

One or more of the edge devices may collect data from a respective data collector 122 and send the data to the hub device 100 via the local network 104. For example, the edge device 600a may collect and send the data 608a to the hub device 100 and the edge device 600n may collect and send the data 608n to the hub device 100.

In embodiments, the model trainer 902 of the hub device 100 may receive the data 608 from one or more of the edge devices 600. For example, the model trainer 902 may receive the data 608a and data 608n. The model trainer 902 may then analyze the received data. The model trainer 902 may then generate a local model update 606a to the local model 602a based on the analysis of the data 608a and generate a local model update 606n to the local model 602n based on the analysis of the data 608n.

In embodiments, the local model update 606a is configured to update the local model 602a and the local model update 606n is configured to update the local model 602n. For example, each of the local model updates 606a, 606n may include computer-executable instructions and/or other data that is configured be loaded into memory and to update the corresponding local models 602a, 602n when executed by a processor of the respective edge device 600a, 600n.

In response to the generating of the local model updates 606a, 606n, the model trainer 902 may deploy the local model updates 606a, 606n to the respective edge device 600a, 600n. Although the above example includes only two model updates, any other number of local model updates 606 may be generated and deployed by the model trainer 902 to respective edge devices 600 based on received data, in the manner described above.

In some embodiments, the data received by the model trainer may be sent to the provider network 102 for analysis and generation of local model updates 606. The model trainer may then receive one or more local model updates 606 from the provider network 102. The local model updates 606 may then be deployed to one or more respective edge devices 600. Thus, in embodiments, there may be multiple tiers of model trainers and/or model training services. At each higher tier, the model trainer and/or model training service may be larger, may access a larger training data set, and may generate local model updates and/or local models configured to provide a higher level of accuracy and confidence for results than the previous tier or other lower tiers.

In embodiments, one or more of the model updates may include one or more new versions of the respective local models configured to replace the respective local models. Thus, instead of just modifying an existing local model, in some cases it is replaced by a different model that is a more recent version.

In some embodiments, the model trainer may initially create and deploy a given local model to an edge device. For example, the model trainer may generate one or more of the local models for one or more of the respective edge devices and then deploy the one or more local models to the respective edge devices. In embodiments, the model trainer may generate a given local model based on topology data or any other data received from a corresponding edge device that will be implementing the local model.

In embodiments, the model trainer may receive global data from one or more other remote networks (e.g., collected by one or more other edge devices of the other networks), analyze the global data, and generate the one or more updates to local models based on the analysis of the received data and the analysis of the global data. The updates may then be deployed to respective edge devices. For example, images captured by cameras from many different homes and/or businesses may be used to enhance training data that is used for generation of local models.

In some embodiments, the model trainer may apply different weights to at least some of the received data and at least some of the global data during the analysis of the received data and the analysis of the global data. For example, a higher weight may be applied to the received data from the local network than to the global data during the analysis of the received data and the analysis of the global data. Thus, an amount of data received by the model trainer service from the local network may have a larger impact on the training of a local model than the same amount of global data received by the model trainer.

Conversely, in some embodiments, a higher weight may be applied to the global data than to the received data from the local network during the analysis of the received data and the analysis of the global data. Thus, an amount of global data received by the model trainer may have a larger impact on the training of a local model than the same amount of data received by the model trainer from the local network.

In embodiments, analysis of data from two or more different edge devices may be used to generate an update for a local model of a particular edge device. Thus, one local model of a particular edge device may be updated and/or trained not only based on data from the particular edge device, but also based on data from one or more other edge devices of the same local network and/or other networks. In other words, the generating of at least one of the updates to a particular local data processing model may be based on analysis of a portion of the data received by the model trainer from two or more different edge devices.

In some embodiments, the model trainer may generate and deploy one or more additional updates for one or more of the respective local data processing models to one or more respective edge devices on a periodic basis and/or in response to a triggering event. For example, updates may be generated based on received data and deployed to edge devices on an hourly, daily, or weekly basis, or in response to the model trainer receiving a command to update one or more of the local models of respective edge devices.

Figure 10:
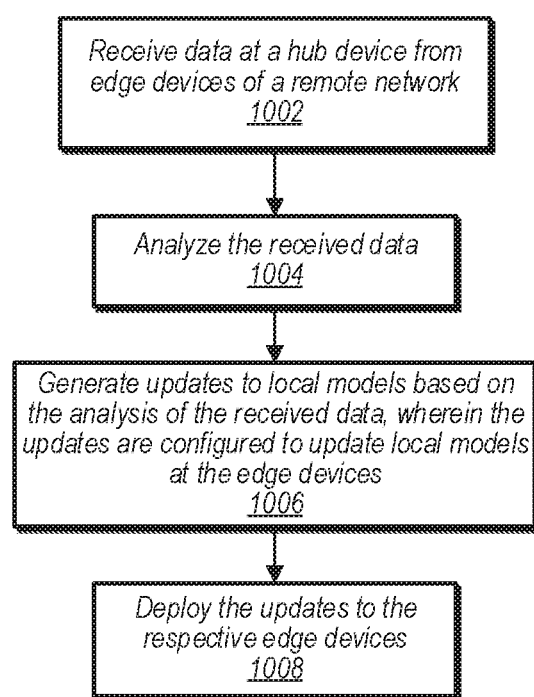
FIG. 10 is a flow diagram that illustrates updating models for edge devices by a hub device, according to some embodiments.

FIG. 10 is a flow diagram that illustrates updating models for edge devices by a hub device, according to some embodiments. At block 1002, a model trainer of the hub device receives data from one or more respective edge devices of a local network. At block 1004, the model trainer analyzes the received data.

At block 1006, the model trainer generates updates to one or more local models based on the analysis of the received data, wherein the one or more updates are configured to update the one or more local models at the respective edge devices. At block 1008, the model trainer deploys the one or more updates to the respective edge devices.

In embodiments, the model training service of the provider network and/or the model trainer may obtain device configuration files (e.g., from an edge device or other source) that may be used to optimize and/or generate the local model updates that are sent to the edge device and applied to the local model to update the local model. For example, the device configuration files may include one or more parameters that indicate one or more software and/or hardware configurations of the edge device (e.g., size of memory, processor speed, etc.).

In some embodiments, the model training service of the provider network and/or the model trainer may obtain one or more indications of the state of one or more edge devices. The indications may be used to optimize and/or generate respective local model updates that are sent to the edge device and applied to the local model to update the local model. For example, the indications may include reliability of a connection for an edge device, an amount of free memory available at an edge device, an amount of non-volatile storage available at an edge device, a health of an edge device (e.g., with respect to a previous health state or with respect to other edge devices of the local network), and any other suitable indication of state of an edge device, where the state may affect how the local model update is optimized and/or generated. Further, in some embodiments, a model of the model training service and/or the provider network may be generated, optimized, and/or modified based on device configuration files for edge devices and/or based on indications of the state of one or more edge devices.

Figure 11:
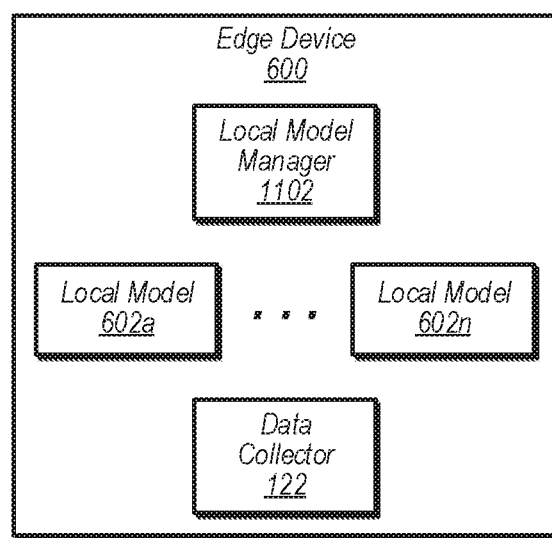
FIG. 11 is a block diagram of an edge device that implements multiple local models, according to some embodiments.

FIG. 11 is a block diagram of an edge device that implements multiple local models, according to some embodiments. In the depicted embodiment, the edge device 600 includes a local model manager 1102 that determines which one of the local models 602a-602n will be used at any given time to process data received from one or more data collectors 122.

In embodiments, the edge device may receive updates to one or more of its local models 602 and/or may receive the local models 602 as deployed models in the same way or similar way as described for the figures above. For example, a model training service of a provider network and/or a model trainer of a hub device may receive data from the edge device 600, analyze the received data, generate one or more updates for one or more of the respective local models 602 based on the analysis, and deploy the one or more updates to the one or more of the respective local models 602.

In some embodiments, the local models 602 are different from each other (e.g., perform one or more different operations than each other for given input data) and the different local models 602 are configured to process different data received at different times by the at least one edge device. Thus, the local model manager 1102 may assign particular time periods to each of the local models to process received data. For example, the local model 602a may be selected by the local model manager 1102 to process data received by the data collector 122 during morning (am) hours, and the local model 602n may be selected by the local model manager 1102 to process data received by the data collector 122 during evening (pm) hours.

In embodiments, the local model manager 1102 may select different ones of the local models 122 in response to detecting different environmental conditions. For example, when the local model manager 1102 determines that an amount of sunlight detected by the data collector 122 is above a threshold level, then the local model manager 1102 may select the model 602a to process data received from the data collector 122. Conversely, when the local model manager 1102 determines that an amount of sunlight detected by the data collector 122 is at or below the threshold level, then the local model manager 1102 may select the model 602n to process data received from the data collector 122.

In various embodiments, different models 602 may have different architectures and be trained using different machine learning techniques and/or data sets. For example, a model training service of a provider network, a model trainer of a hub device, and/or a local model trainer of the edge device may use ensemble methods to use different machine learning algorithms to generate different models (e.g., neural network, deep neural network, memory network, etc.). By using two or more models to process the same collected data, a consensus of the results from multiple models (e.g., majority or quorum) may be used to select a result/prediction.

In embodiments, boosting and/or stacking may be used to take advantage of the multiple different models on an edge device. For example, boosting may include generating multiple models by training each new model to emphasize training instances that previous models misclassified. Stacking may include combining information from multiple predictive models to generate a new model (e.g., a stacked model or second-level model). In some embodiments, a stacked model outperforms each of the individual models due to its ability to use or give more weight to results for each base model where it performs best (e.g., makes more accurate predictions than the other models) and/or its ability to discredit or use less weight for results for each base model that performs worse (e.g., makes less accurate predictions than other models). In embodiments, the more different the base models are from each other, the more accurate results a stacked model may provide.

Figure 12:
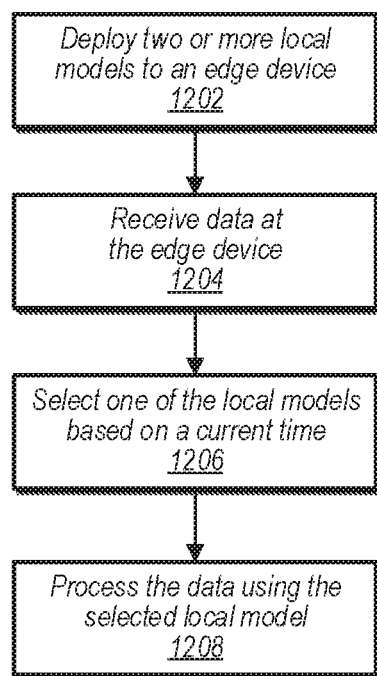
FIG. 12 is a flow diagram that illustrates selecting a local model to process data at an edge device, according to some embodiments.

FIG. 12 is a flow diagram that illustrates selecting a local model to process data at an edge device, according to some embodiments. At block 1202, the model training service of a provider network and/or the model trainer of a hub device deploys two or more local models to an edge device of a local network. At block 1204, the edge device receives data. For example, the edge device may receive data from one or more sensors of the edge device (e.g., environmental sensors) and/or from one or more other edge devices of the local network.

At block 1206, the local model manager selects one of the local models of the edge device to process the data based at least on a current time. In some embodiments, the local model manager selects one of the local models of the edge device to process the data based at least on an environmental condition (e.g., environmental data collected by a sensor). In some embodiments, the local model manager selects one of the local models of the edge device to process the data based at least on a state of the edge device. For example, if the remaining useful life of a battery of the edge device is below a threshold amount of time, then the local model manager may select one of the models that consumes the least amount of power to process data, such as switching from a model that requires a GPU of the edge device to execute to one that only requires a CPU of the edge device to execute. At block 1208, the edge device processes the data using the selected local model.

Figure 13:
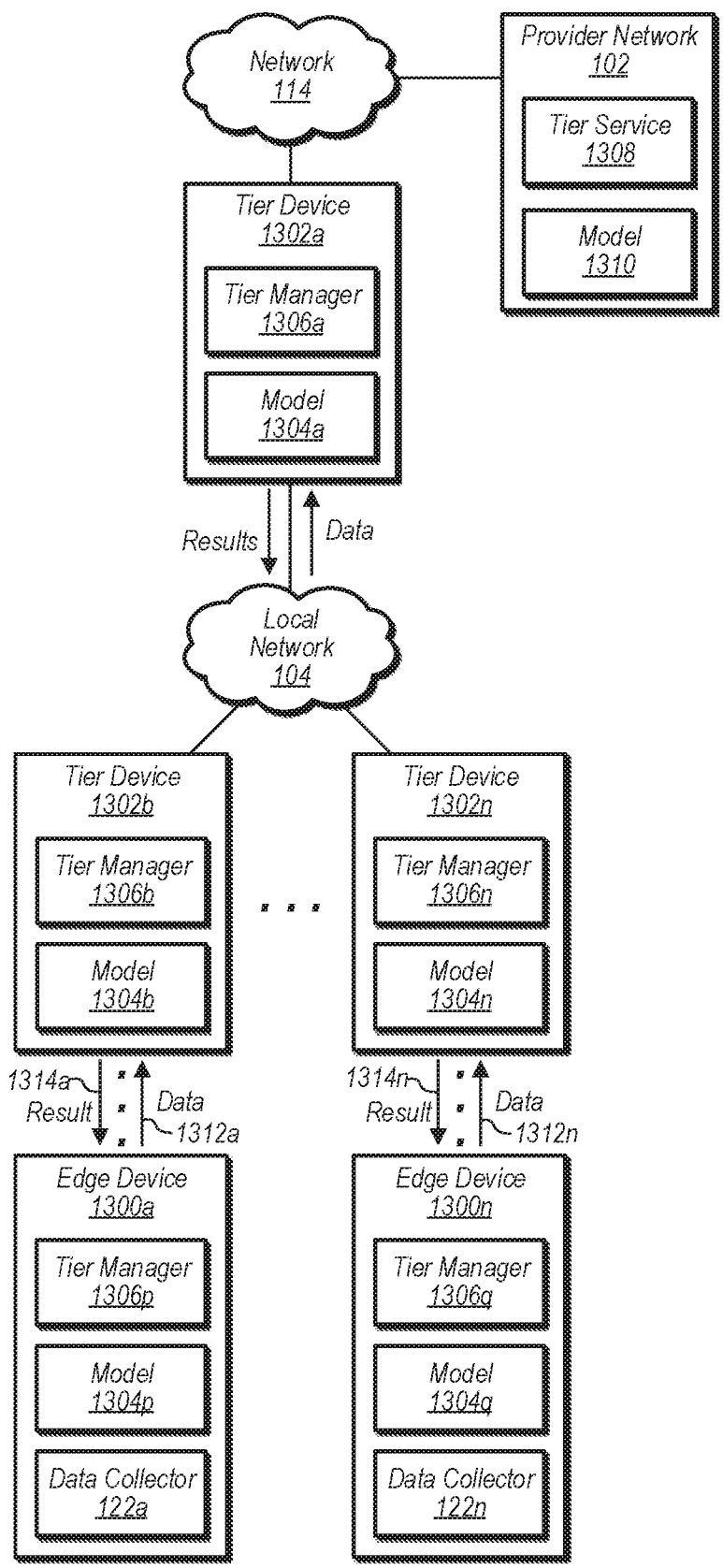
FIG. 13 illustrates a system for implementing model tiering across multiple devices of a network, according to some embodiments.

FIG. 13 illustrates a system for implementing model tiering across multiple devices of a network, according to some embodiments. In the depicted embodiment, the local network includes edge devices 1300 and tier devices 1302. As shown, a given edge device 1300 or tier device 1302 includes a model 1304. The model 1304 may be operate in the same or similar way as described above for the local model 108. Thus, the model 1304 may include software and/or hardware that performs one or more operations on received data. In embodiments, the one or more operations may include analyzing the data, modifying the data based on the analyzing, and/or generating a result based on the analyzing (e.g., prediction, new data, one or more commands, or some other result). For example, the result may be a local prediction. In some embodiments, the local prediction may be received by a tier manager 1306.

In some embodiments, the tier device 1302a (e.g., the tier manager 1306a) may transmit the data received from one or more tier devices 1302b-1302n to the provider network 102. The data may be transmitted via a wide-area network 114 (e.g., the internet). Thus, the provider network 102 may be considered a remote provider network and may be in another physical location than the hub devices, such as another city, state, or country. In embodiments, the provider network 102 includes a tier service 1308 and a model 1310 that receives the data from the tier device 1302a and processes the received data.

In some embodiments, the tier device 1302a behaves in a way similar to a hub device as described above. In other embodiments, tier device 1302a may actually include multiple different tier devices 1302 that each may communicate with the provider network. Thus, any level of redundancy or any other topology scheme of tier and edge devices and/or number of tier and edge devices may be implemented, in embodiments. For example, the tier devices and/or edge devices may be arranged in a network topology including one or more of a tree topology, mesh topology, star topology, fully connected topology, partially connected topology, bus topology, ring topology, line topology, point-to-point topology, daisy chain topology, and hybrid topology.

In embodiments, the edge devices 1300 include data collectors 122. An edge device may collect data 1312 via the data collector. In some embodiments, the tier manager 1306 may receive and/or analyze the data 1312. The tier manager 1306 may determine whether to process the data 1312 using a model 1304 of the edge device or to send the data 1312 to one or more tier devices 1302 of the network 104. Depending on the determination, the tier manager 1306 either processes the data 1312 using the model 1304 or sends the data 1312 to a tier device 1302.

In embodiments, the tier device 1302 receives the data 1312 from the edge device 1302 and the tier manager 1306 of the tier device 1302 determines whether to process the data using a higher tier model 1304 of the tier device 1302. In some embodiments, the tier manager 1306 of the tier device 1302 receives and/or analyzes the data 1312. In embodiments, the higher tier model 1304 is larger than the model 1304 of the edge device 1300 and/or generates a result (e.g., prediction) with a higher confidence level than the model 1304 of the edge device 1300 for given data 1312. In embodiments, the tier device has a larger memory and/or faster processor.

In response to determining to process the data using the higher tier model 1304, the tier manager 1306 of the tier device 1302 processes the data using the higher tier model 1304, generates a result 1314 based on the processing, and sends the result 1314 to the edge device 1300 and/or another endpoint. In embodiments, the edge device 1300 performs and action and/or generates a command in response to receiving the result 1314.

In response to determining not to process the data 1312 using the higher tier model 1304, the tier manager 1306 of the tier device 1302 sends the data 1312 to another tier device 1302 (or to the provider network 102), where the data is processed by another model to generate a result 1314. In embodiments, the tier device 1302 then receives the result 1314 from the other tier device 1302 (or from the provider network 102), wherein the result is based on the data 1312.

The tier device 1302 may then send the result 1314 to the edge device 1300 and/or another endpoint.

In embodiments, the edge device (e.g., the tier manager of the edge device) may determine, based on criteria, whether to process the data using the model of the edge device or to send the data to the tier device. The criteria may include one or more of an amount of energy required for the model to process the data, an amount of time required for the model to process the data, an amount of time since the model was updated, an amount of bandwidth available to send the data to the tier device (including, in some cases, no bandwidth), and a reliability of the network connection between the edge device and one or more other devices of the local network (e.g., amount of time there is a connectivity vs. no connectivity).

For example, the tier manager of the edge device may determine that an amount of time and/or energy required for the model to process the data is above a threshold amount and in response, send the data to the tier device. Conversely, the tier manager of the edge device may determine that the amount of time and/or energy required for the model to process the data is not above a threshold amount and in response, process the data using the model of the edge device.

In embodiments, the tier manager may determine that an amount of time since the model was updated is above a threshold amount and in response, send the data to the tier device. Conversely, the tier manager of the edge device may determine that that the amount of time since the model was updated is not above the threshold amount and in response, process the data using the model of the edge device.

In some embodiments, the tier manager may determine that an amount of bandwidth available to send the data to the tier device is above a threshold value and in response, send the data to the tier device. Conversely, the tier manager of the edge device may determine that that the amount of bandwidth available to send the data to the tier device is not above a threshold value and in response, process the data using the model of the edge device.

In embodiments, the above criteria may be also be used by a tier manager of a tier device to determine whether to process the data using the model of the tier device or to send the data to another tier device (or to the provider network). Thus, in embodiments, the data may by propagated through one or more tier devices until a particular tier device processes the data. After the particular tier device processes the data, the result from the processing may be propagated back to the edge device and/or to one or more other endpoints.

In some embodiments, an edge device or tier device may generate a prediction based on processing of the data 1312 using the model of the edge device or the tier device. The tier manager may then determine whether a confidence level of the prediction is below a threshold confidence level. If so, then the tier manager may send the data to a tier device (or another tier device) for processing by a model of the tier device (or other tier device). If not, then the edge device or the tier device may use the prediction (e.g., to generate a response), without sending the data on to the tier device (or to the other tier device).

Thus, in embodiments, data may be propagated to one or more tier devices until the confidence level for the prediction is not below the threshold level. At that point, the prediction may be propagated back to the edge device and/or to one or more other endpoints. In embodiments, the provider network may include the highest tier model. Therefore, the furthest that data can propagate may be to the model 1310 of the provider network. Thus, in embodiments, the tier service 1308 makes determinations as described above for the tier manager 1306.

Figure 14:
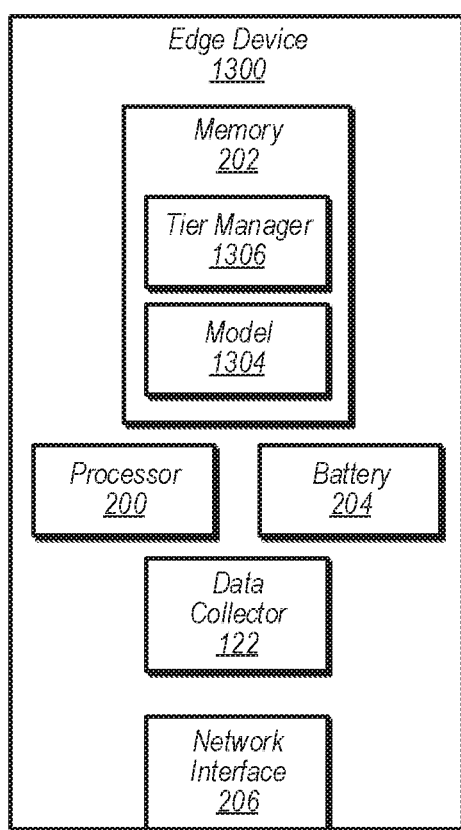
FIG. 14 is a block diagram of an edge device that implements a model and a tier manager, according to some embodiments.

FIG. 14 is a block diagram of an edge device that implements a model and a tier manager, according to some embodiments. In the depicted embodiment, the edge device 1300 includes processor 200, a memory 202, a battery 204, a network interface 206, and one or more data collectors 122. The memory 202 includes a tier manager 1306 and a model 1304. In embodiments, a tier device 1302 may include some or all of the components described for the edge device 1300.

In some embodiments, the memory 202 includes executable instructions and the processor 208 executes the instructions in order to implement the tier manager 1306 and/or the model 1304. In embodiments, the network interface 206 communicatively couples the edge device 1300 to the local network. Thus, the edge device 1300 may transmit data to and receive data from tier devices via the network interface 206. In embodiments, the network interface 206 may transmit data via a wired or wireless interface.

In some embodiments, the edge device and one or more of its components (e.g., processor and memory) may be relatively lightweight and smaller compared to components (e.g., processor and memory) used by the tier devices or the provider network to implement the models. For example, the size of one or more memories and/or one or more processors used by the tier devices or servers of the provider network may be at least an order of magnitude larger than the size of the memory and/or the processor used by the edge device 1300.

Therefore, in embodiments, the models of tier devices or the provider network may produce more accurate results (e.g., predictions) with higher confidence levels, and at a faster rate than the model of the edge devices. In embodiments, the higher up a tier device is in the hierarchy of tier devices, the larger the model is. Thus, each step up in level may provide a more accurate result with higher confidence levels, and/or at a faster rate than one or more lower levels.

Figure 15:
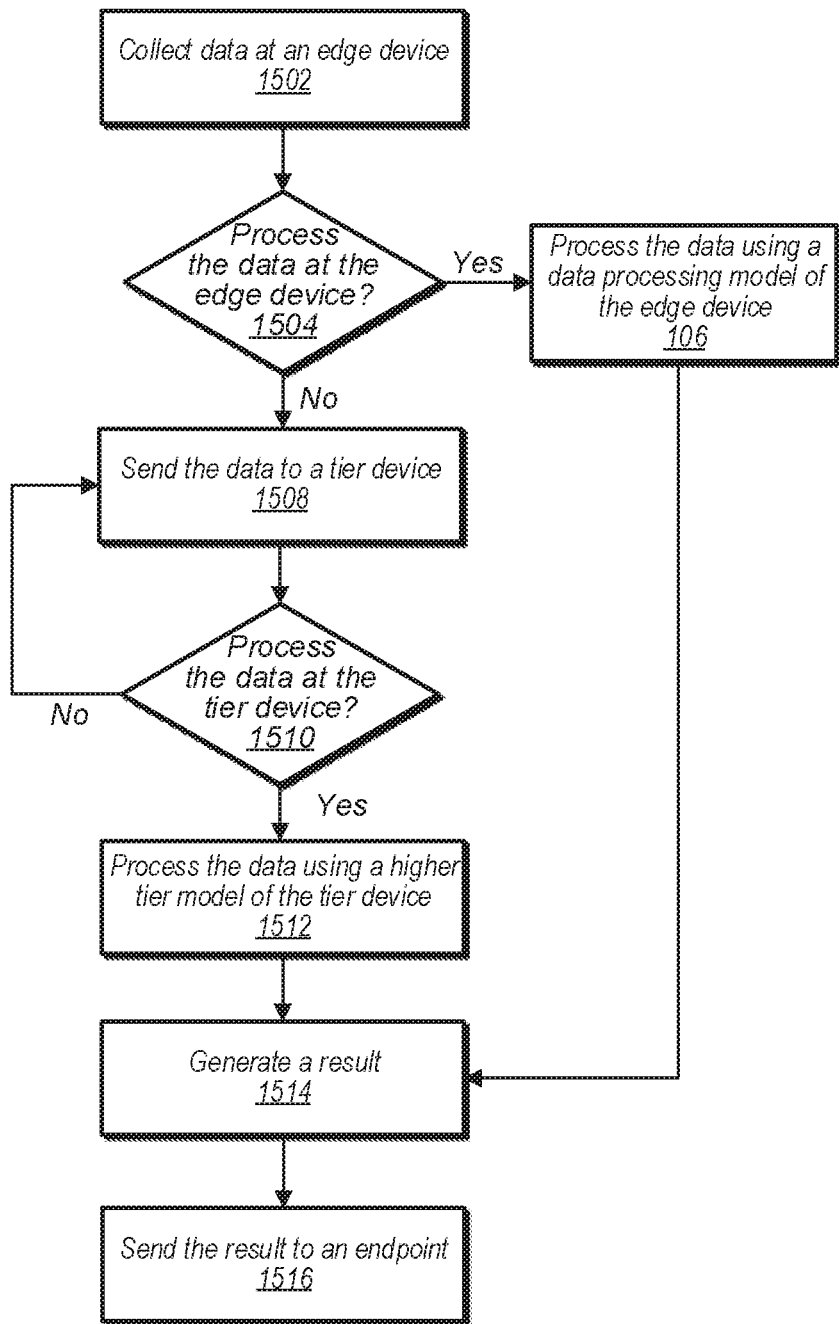
FIG. 15 is a flow diagram that illustrates implementing model tiering across multiple devices of a network, according to some embodiments.

FIG. 15 is a flow diagram that illustrates implementing model tiering across multiple devices of a network, according to some embodiments. At block 1502, a data collector collects data at an edge device. At block 1504, the tier manager determines whether to process the data using a model of the edge device or to send the data a tier device connected to the network. If the tier manager determines to process the data at the edge device, then at block 1506, the edge device processes the data using the model of the edge device. Then the model generates a result at block 1514.

If the tier manager determines to not process the data at the edge device, then at block 1508, the edge device sends the data to the tier device. In embodiments, the tier device may be located at a bottom level of a hierarchy of tier devices. At block 1510, the tier manager of the tier device determines whether to process the data using a model of the tier device or to send the data to another tier device connected to the network. In embodiments, the other tier device may be located at the next level up from the current tier device. If the tier manager determines to send the data to the other tier device, then the process returns to block 1508.

If the tier manager determines to process the data using a model of the tier device, then at block 1512, the tier device processes the data using the model of the tier device. Then the model of the tier device generates a result at block 1514. At block 1516, the tier device sends the result to an endpoint. For example, the tier device may send the result back to the tier device or edge device that it received the data from and/or the tier device may send the result to one or more other endpoints.

Figure 16:
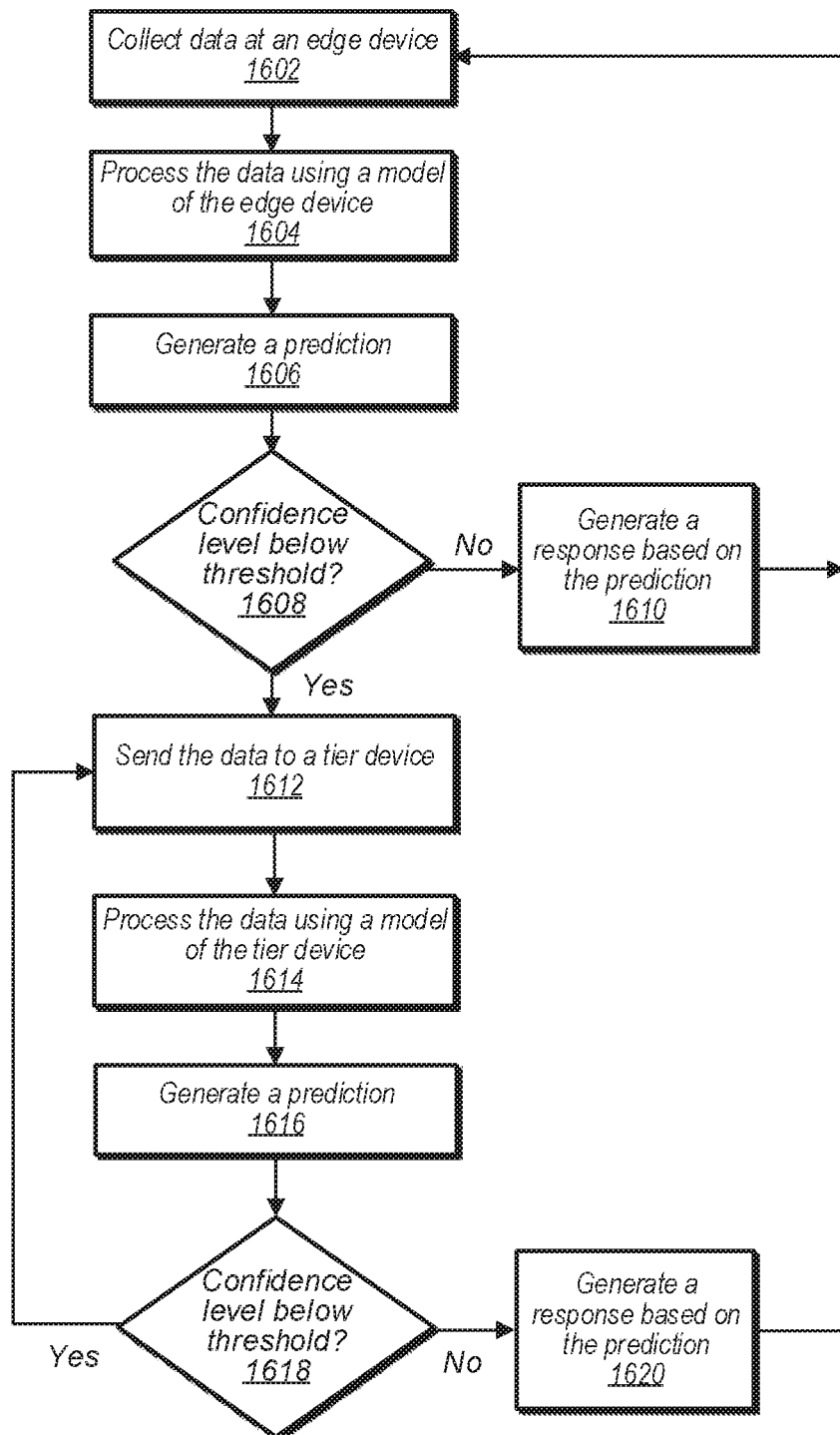
FIG. 16 is a flow diagram that illustrates implementing model tiering across multiple devices of a network to generate a prediction, according to some embodiments.

FIG. 16 is a flow diagram that illustrates implementing model tiering across multiple devices of a network to generate a prediction, according to some embodiments. At block 1602, a data collector collects data at an edge device. At block 1604, model of the edge device processes the data. In embodiments, the tier manager determines to process the data using the model of the edge device and in response, the model processes the data.

At block 1606, the model generates a prediction. At block 1504, the tier manager determines whether a confidence level for the prediction is below a threshold level. If the tier manager determines that the confidence level is not below the threshold level, then at block 1610, the tier manager generates a response based on the prediction. The process then returns to block 1602.

If the tier manager determines that the confidence level is below the threshold level, then at block 1612, the tier manager sends the data to a tier device. At block 1614, the tier device processes the data using a model at the tier device. In embodiments, a tier manager of the tier device determines to process the data using the model of the tier device and in response, the model of the tier device processes the data.

At block 1616, the model of the tier device generates a prediction. At block 1618, the tier manager of the tier device determines whether a confidence level for the prediction is below the threshold level. If the tier manager determines that the confidence level is not below the threshold level, then at block 1620, the tier manager generates a response based on the prediction. The process then returns to block 1602.

At block 1616, if the tier manager determines that the confidence level is below the threshold level, then the process returns to block 1612, where the tier manager sends the data to another tier device. For example, the tier device may be a part of a hierarchy of tier devices as described above. Thus, the tier manager may send the data to the next tier device in the hierarchy. As described above, this process may continue until a prediction is generated with a confidence level that is not below the threshold level (e.g., a minimum confidence level).

Figure 17:
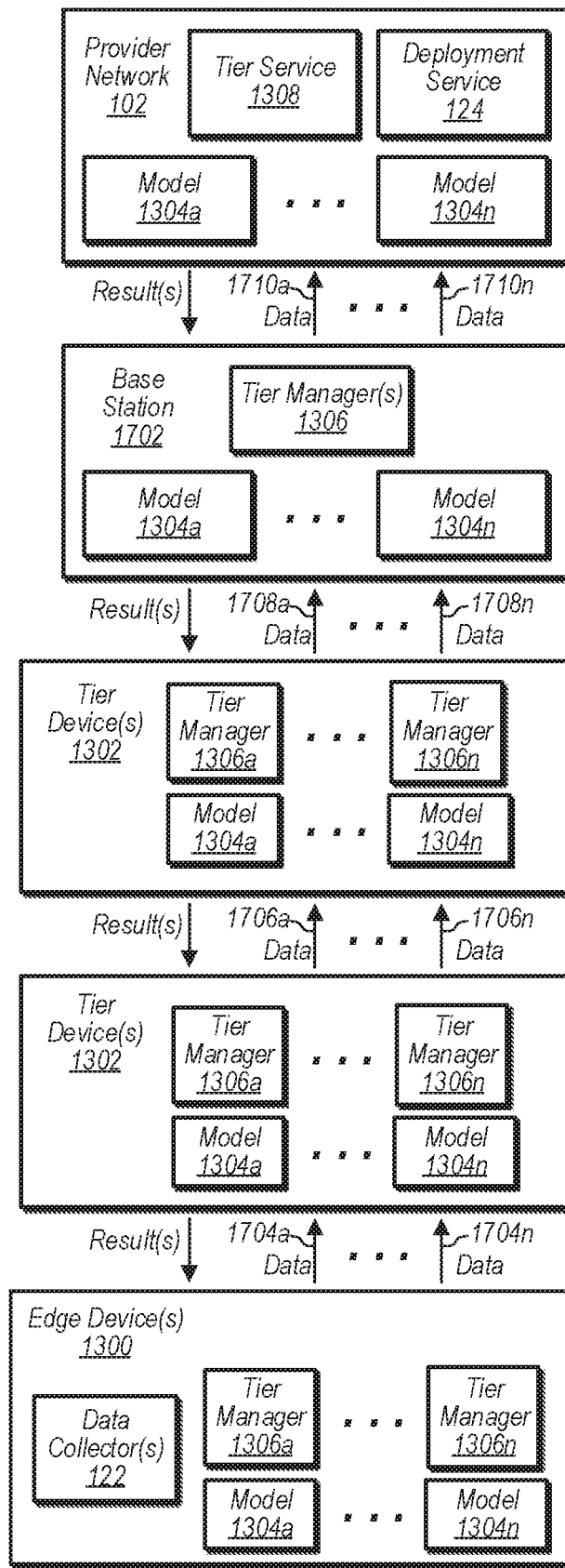
FIG. 17 illustrates a system for implementing model tiering by sending different portions of data to different models, according to some embodiments.

FIG. 17 illustrates a system for implementing model tiering by sending different portions of data to different models, according to some embodiments. In the depicted embodiment, a local network includes edge devices 1300 and tier devices 1302. As shown, the tier devices may be arranged in a hierarchy of different tiers. In embodiments, the local network may be arranged in one or more of the topologies discussed above for FIG. 13.

In embodiments, one or more of the tiers may include other devices outside of the local network, such as a base station 1702 and a provider network 102. For example, in embodiments, the base station 1702 may include one or more tier managers 1306 operating on one or more respective tier devices 1302 that include respective models 1304. The base station 1302 may communicate with the provider network 102 and at least some of the tier devices 1302 of the local network via a wide-area network 114 (e.g., the internet).

As discussed above, the model 1304 may include software and/or hardware that performs one or more operations on received data. In embodiments, the one or more operations may include analyzing the data, modifying the data based on the analyzing, and/or generating a result based on the analyzing (e.g., prediction, new data, one or more commands, or some other result). For example, the result may be a local prediction. In some embodiments, the local prediction may be received by a tier manager 1306.

In embodiments, there may be one or more edge devices that each include a tier manager, at least one model, and at least one data collector. Each level of tier devices may include one or more tier devices that each include a tier manager and at least one model. In embodiments, any number of levels of edge and/or tier devices may exist.

In embodiments, an edge device 1300 may collect data via one or more data collectors. In some embodiments, the collected data may include two or more different portions of data 1704. The tier manager 1306 may receive and/or analyze the data 1312. In some embodiments, the tier manager 1306 may split the received data into the two or more different portions of data 1704. For example, image data captured from a camera may be de-muxed into red image data, green image data, and blue image data. As another example, a portion of the data may be data collected from one sensor (e.g., audio data from a microphone) and another portion of the data may be image data collected from another sensor (e.g., a camera).

The tier manager 1306 may determine whether to process the portions of data 1704 at one or more respective models 1304 of the edge devices or to send the portions of data 1704 to one or more respective tier devices 1302. Depending on the determination, the tier manager 1306 either processes the portions of data 1704 using the respective models 1304 or sends the portions of data 1704 to the respective tier devices at the first or bottom level of tier devices 1302. In some embodiments, the portions of data 1704 are generated by different models of respective edge devices 1300. Thus, in some embodiments, the above determinations may be made by multiple tier managers of the respective edge devices (e.g., using suitable techniques of distributed computing/processing, majority consensus, etc.)).

In some embodiments, the tier manager 1306 may determine to process the portions of data 1704 at one or more respective models 1304 of the edge devices and send the processed portions of data 1704 to one or more respective tier devices 1302. Thus, the portions of data 1704 sent to the one or more respective tier devices 1302 may be data collected by the data collectors 122 that has been modified and/or transformed by the one or more respective models 1304.

In embodiments, the respective tier devices 1302 receive the portions of data 1704 from the respective edge devices 1302 and the tier managers 1306 of the respective tier devices 1302 determine whether to process the portions of data 1704 using respective higher tier models 1304 of the tier devices 1302. In some embodiments, the tier managers 1306 of the tier devices 1302 receive and/or analyze the portions of data 1704 to make the above determination.

In embodiments, the higher tier models 1304 are larger than the models 1304 of the edge devices 1300 and/or generate one or more results (e.g., prediction) with a higher confidence level than the model 1304 of the edge device 1300 for given portions of data 1704. In embodiments, the tier devices have a larger memory and/or faster compute hardware. In some embodiments, only one tier manager makes the above determinations instead of multiple tier managers. In some embodiments, the respective tier managers collectively make the above determinations (e.g., using suitable techniques of distributed computing/processing, majority consensus, etc.).

In response to determining to process the portions of data 1704 using the higher tier models 1304, the tier managers 1306 of the tier devices 1302 process the portions of data 1704 using the higher tier models 1304, generate results based on the processing, and send the results to the edge devices 1300 and/or another endpoint (e.g., one or more tier devices 1302 of the next tier). For example, the tier managers 1306 of the tier devices 1302 at any given level may use respective models 1304 to modify and/or transform the data received from a lower tier device 1302 and send the modified/transformed data 1706, 1708, 1710, to the next level of one or more tier devices 1302 or the tier service 1308. In embodiments, the one or more edge devices 1300 perform an action and/or generates a command in response to receiving the results. Moreover, in some embodiments, the results are consolidated into one result or a smaller number of results.

In some embodiments, in response to determining not to process the portions of data 1704, 1706, 1708 using the higher tier model 1304, the tier manager 1306 of the tier device 1302 may send the portions of data 1704 to another level of tier devices 1302 (or to the provider network 102), where the portions of data 1704, 1706, 1708, 1710 are processed by other models to generate one or more results. In embodiments, the tier devices 1302 then receive the one or more results from the other tier devices 1302 (or from the provider network 102), wherein the one or more results are based on the portions of data 1704, 1706, 1708, 1710. The tier devices 1302 may then send the one or more results to the edge devices 1300 and/or one or more other endpoints. For example, one image processing model of a particular tier device may process sensor data from a red light spectrum, another image processing model of another tier device may process sensor data from a green light spectrum, and another image processing model of another tier device may process sensor data from blue light spectrum.

As discussed above for an individual edge device, the edge devices (e.g., the tier managers of the edge devices) may determine, based on criteria, whether to process the portions of data 1704 using the models of the edge devices or to send the portions of data 1704 to the tier devices. As discussed above, the criteria may include one or more of an amount of energy required for the model to process the portions of data 1704, an amount of time required for the model to process the portions of data 1704, an amount of time since the model was updated, and an amount of bandwidth available to send the portions of data 1704 to the tier devices.

For example, the one or more tier managers of the one or more edge devices may determine that an amount of time and/or energy required for the model to process the portions of data 1704 is above a threshold amount and in response, send the portions of data 1704 to the tier devices. Conversely, one or more tier managers of the one or more edge devices may determine that the amount of time and/or energy required for the model to process the portions of data 1704 is not above a threshold amount and in response, process the portions of data 1704 using the model of the edge device.

In embodiments, the one or more tier managers may determine that an amount of time since the models were updated is above a threshold amount and in response, send the portions of data 1704 to the tier devices. Conversely, the one or more tier managers of the edge devices may determine that that the amount of time since the models were updated is not above the threshold amount and in response, process the portions of data 1704 using the models of the edge devices.

In some embodiments, the one or more tier managers may determine that an amount of bandwidth available to send the portions of data 1704 to the tier device is above a threshold value and in response, send the portions of data 1704 to the tier device. Conversely, the one or more tier managers of the edge devices may determine that that the amount of bandwidth available to send the portions of data 1704 to the tier devices is not above a threshold value and in response, process the portions of data 1704 using the models of the edge devices.

In embodiments, the above criteria may be also be used by one or more tier managers of the tier devices to determine whether to process the portions of data 1704, 1706, 1708 using the models of the tier devices or to send the portions of data 1704, 1706, 1708, 1710 to other tier devices of another tier (or to the provider network). Thus, in embodiments, the portions of data 1704, 1706, 1708, 1710 may by propagated through one or more tiers of tier devices (as modified/transformed data or as unmodified data) until a particular group of tier devices (or provider network) processes the portions of data 1704 (or finishes modifying and/or transforming the portions of data 1704, 1706, 1708, 1710). After the tier devices process the portions of data 1704 or finishes modifying and/or transforming the portions of data 1704, 1706, 1708, 1710), one or more results from the processing may be propagated back to the edge device and/or to one or more other endpoints.

As discussed above for an individual edge device or tier device, edge devices or tier devices may generate a prediction based on processing of the portions of data 1704, 1706, 1708, 1710. One or more tier managers may then determine whether a confidence level of the prediction is below a threshold confidence level. If so, then the one or more tier managers may send the data to tier devices (or next level of tier devices) for processing by models of the tier devices (or next level of tier devices). If not, then the edge devices or the tier devices may use the prediction (e.g., to generate one or more responses), without sending the portions of data 1704, 1706, 1708 on to the tier devices (or to the next level of tier devices).

Thus, in embodiments, portions of data 1704, 1706, 1708, 1710 may be propagated to one or more tier devices until the confidence level for the prediction is not below the threshold level. At that point, the prediction may be propagated back to the one or more of the edge devices and/or to one or more other endpoints. In embodiments, the provider network may include the highest tier model. Therefore, the furthest that portions of data 1704, 1706, 1708, 1710 can propagate may be to the model 1310 of the provider network. Thus, in embodiments, the tier service 1308 makes determinations as described above for the tier managers 1306.

Figure 18:
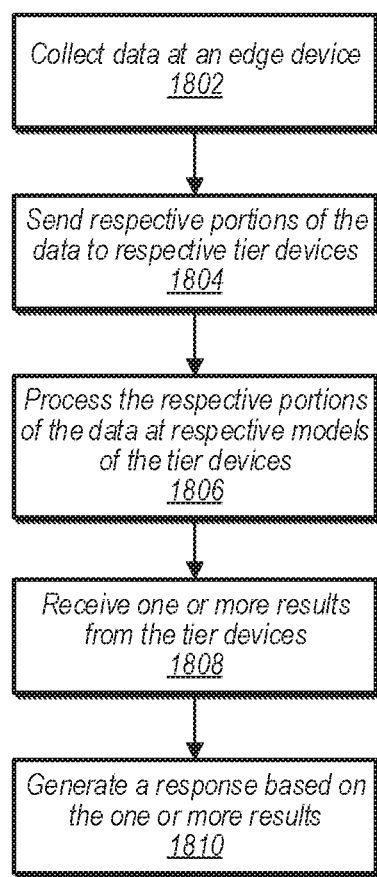
FIG. 18 is a flow diagram that illustrates implementing model tiering by sending different portions of data to different models, according to some embodiments.

FIG. 18 is a flow diagram that illustrates implementing model tiering by sending different portions of data to different models, according to some embodiments. At block 1802, a one or more data collectors collect data at an edge device. As described above, the data may be collected by different edge devices.

At block 1804, the one or more edge devices send respective portions of the data to respective tier devices. At block 1806, the tier devices process the respective portions of the data at respective models of the tier devices. As described above, in some embodiments, the portions of data may be propagated to one or more additional levels of tier devices before being returned to the tier devices. At block 1808, the one or more edge devices receive one or more results from the tier devices. At block 1810, the one or more edge devices generate a response (or multiple responses) based on the one or more results.

In some embodiments, any of the models described in FIGS. 1-18 may operate within the context of a reinforcement learning process for training/modifying the models. For example, the provider network and/or hub device may obtain topology data from the local network at multiple points in time (e.g., on a periodic basis) and based on the topology data, periodically modify or replace models to improve accuracy of the models, improve confidence levels of the results (e.g. predictions) generated by the models, and/or to improve performance of the local network.

In embodiments, the reinforcement learning process is used to obtain a minimum level of confidence for predictions while minimizing one or more costs associated with obtaining the predictions. For example, the cost due to network traffic/latency and/or power consumption by edge devices may be minimized, while still obtaining a minimum level of accuracy. In embodiments, a level of confidence and/or a level of accuracy may be measured in terms of a percentage (e.g., 99% or 90.5%) or any other value suitable for quantifying level of confidence or accuracy, from no confidence or accuracy (e.g., 0%) to full confidence or accuracy (e.g., 100%).

In some embodiments, any of the models of the hub device, edge devices, tier devices, or provider network described in FIGS. 1-18 may operate within the context of an event-driven execution environment. For example, one or more functions of the model may be assigned to respective events, such that a particular function is triggered in response to detection, by the event-driven execution environment, of an event assigned to the particular function (e.g., receiving data from one or more particular edge devices). In embodiments, the function may include one or more operations to process the received data, and may generate a result (e.g., prediction).

Figure 19:
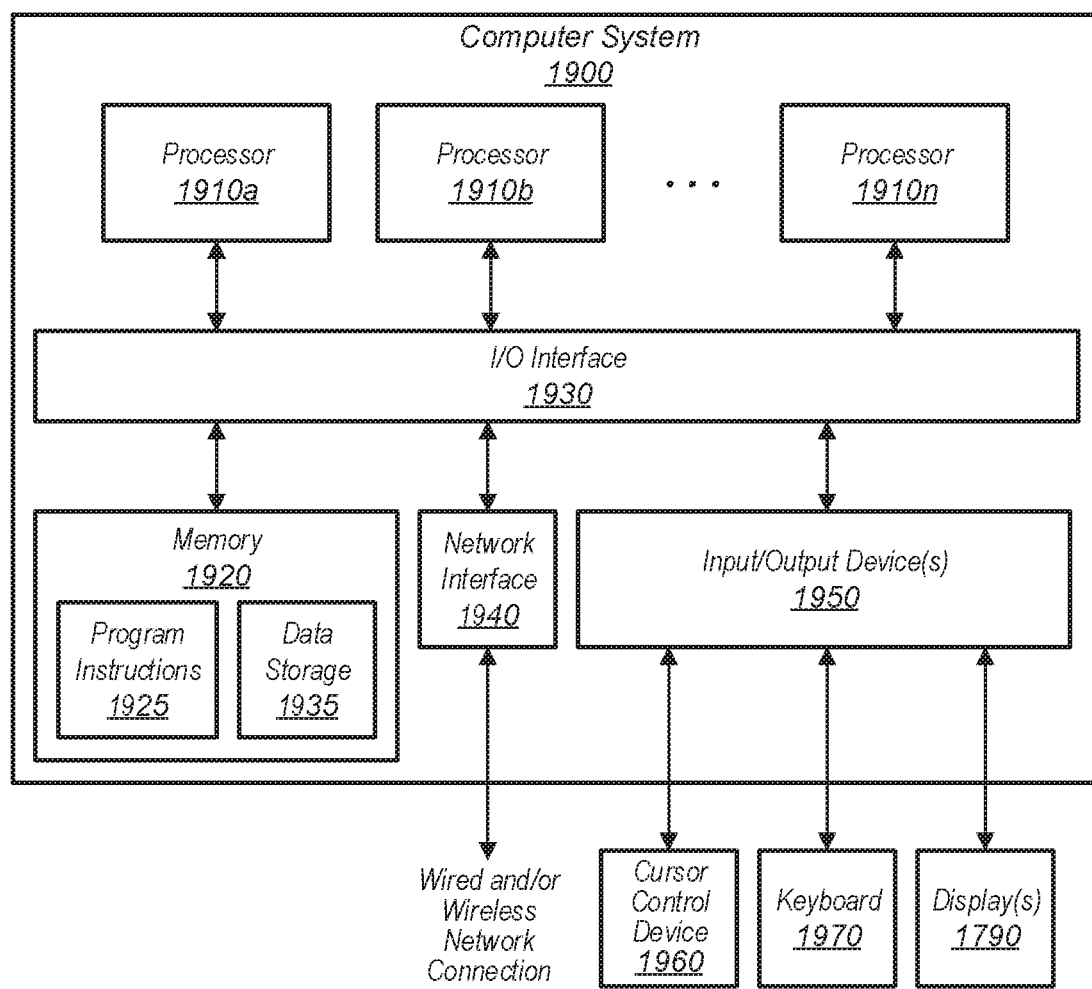
FIG. 19 is a block diagram illustrating an example computer system that implements some or all of the techniques described herein, according to some embodiments.

Any of various computer systems may be configured to implement processes associated with the provider network, base station, hub devices, edge devices, tier devices, or any other component of the above figures. For example, FIG. 19 is a block diagram illustrating an example computer system that implements some or all of the techniques described herein, according to some embodiments. In various embodiments, the provider network, base station, hub devices, edge devices, tier devices, or any other component of any of FIGS. 1-18 may each include one or more computer systems 1900 such as that illustrated in FIG. 19. In embodiments, the provider network, base station, hub devices, edge devices, tier devices, or any other component may include one or more components of the computer system 1900 that function in a same or similar way as described for the computer system 1900.

In the illustrated embodiment, computer system 1900 includes one or more processors 1910 coupled to a system memory 1920 via an input/output (I/O) interface 1930. Computer system 1900 further includes a network interface 1940 coupled to I/O interface 1930. In some embodiments, computer system 1900 may be illustrative of servers implementing enterprise logic or downloadable application, while in other embodiments servers may include more, fewer, or different elements than computer system 1900.

In various embodiments, computer system 1900 may be a uniprocessor system including one processor 1910, or a multiprocessor system including several processors 1910 (e.g., two, four, eight, or another suitable number). Processors 1910 may be any suitable processors capable of executing instructions. For example, in various embodiments, processors 1910 may be embedded processors implementing any of a variety of instruction set architectures (ISAs), such as the x106, PowerPC, SPARC, or MIPS ISAs, or any other suitable ISA. In multiprocessor systems, each of processors 1910 may commonly, but not necessarily, implement the same ISA.

System memory 1920 may be configured to store instructions and data accessible by processor 1910. In various embodiments, system memory 1920 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the file gateway, object storage system, client devices, or service provider are shown stored within system memory 1920 as program instructions 1925. In some embodiments, system memory 1920 may include data 1935 which may be configured as described herein.

In one embodiment, I/O interface 1930 may be configured to coordinate I/O traffic between processor 1910, system memory 1920 and any peripheral devices in the system, including through network interface 1940 or other peripheral interfaces. In some embodiments, I/O interface 1930 may perform any necessary protocol, timing or other data transformations to convert data signals from one component (e.g., system memory 1920) into a format suitable for use by another component (e.g., processor 1910). In some embodiments, I/O interface 1930 may include support for devices attached through various types of peripheral buses, such as a variant of the Peripheral Component Interconnect (PCI) bus standard or the Universal Serial Bus (USB) standard, for example. In some embodiments, the function of I/O interface 1930 may be split into two or more separate components, such as a north bridge and a south bridge, for example. Also, in some embodiments, some or all of the functionality of I/O interface 1930, such as an interface to system memory 1920, may be incorporated directly into processor 1910.

Network interface 1940 may be configured to allow data to be exchanged between computer system 1900 and other computer systems 1900 or devices attached to a network, such as the local network discussed above, a wide-area network, or a local network within the provider network, for example. In particular, network interface 1940 may be configured to allow communication between computer system 1900 and/or various I/O devices 1950. I/O devices 1950 may include scanning devices, display devices, input devices and/or other communication devices, as described herein. Network interface 1940 may commonly support one or more wireless networking protocols (e.g., Wi-Fi/IEEE 802.11, or another wireless networking standard). However, in various embodiments, network interface 1940 may support communication via any suitable wired or wireless general data networks, such as other types of Ethernet networks, for example. Additionally, network interface 1940 may support communication via telecommunications/telephony networks such as analog voice networks or digital fiber communications networks, via storage area networks such as Fibre Channel SANs, or via any other suitable type of network and/or protocol.

In some embodiments, system memory 1920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1900 via I/O interface 1930. A computer-readable storage medium may also include any volatile or non-volatile media such as RAM (e.g. SDRAM, DDR SDRAM, RDRAM, SRAM, etc.), ROM, etc., that may be included in some embodiments of computer system 1900 as system memory 1920 or another type of memory. Further, a computer-accessible medium may include transmission media or signals such as electrical, electromagnetic, or digital signals, conveyed via a communication medium such as a network and/or a wireless link, such as may be implemented via network interface 1940.

In some embodiments, I/O devices 1950 may be relatively simple or "thin" client devices. For example, I/O devices 1950 may be configured as dumb terminals with display, data entry and communications capabilities, but otherwise little computational functionality. However, in some embodiments, I/O devices 1950 may be computer systems configured similarly to computer system 1900, including one or more processors 1910 and various other devices (though in some embodiments, a computer system 1900 implementing an I/O device 1950 may have somewhat different devices, or different classes of devices).

In various embodiments, I/O devices 1950 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1950 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1900. In general, an I/O device 1950 (e.g., cursor control device 1960, keyboard 1970, or display(s) 1980 may be any device that can communicate with elements of computing system 1900.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   at least one hub device connected to a network, comprising:
   one or more processors; and
   one or more memories, wherein the one or more memories have stored thereon instructions, which when executed by the one or more processors, cause the one or more processors to implement:
   a local data processing model, wherein the local data processing model is configured to perform one or more operations on data received from one or more edge devices connected to the network to generate a local result; and
   a result manager, wherein the result manager is configured to:
   send the data received from the edge devices to a remote provider network;
   generate an initial response before receiving the remote result;
   receive the remote result from the remote provider network, wherein the remote result is based on performance, by a remote data processing model at the provider network, of one or more operations on the data received from the edge devices to generate an initial remote result, and wherein the remote result is smaller than the initial remote result and comprises one or more delta values based on differences between the local result and the initial remote result; and
   determine, based on the remote result and the local result, whether to correct the local result to generate an additional response different than the initial response previously generated by the result manager based on the local result.

2. The system as recited in claim 1, wherein the result manager is configured to:
   determine, based on a confidence level for the local result, whether to generate the initial response before receiving the remote result.

3. The system as recited in claim 1, wherein the result manager is configured to:
   determine a confidence level for the local result;
   determine a confidence level for the remote result; and
   if the confidence level for the local result is lower than the confidence level for the remote result, correct the local result to generate the corrected result.

4. The system as recited in claim 1, wherein the result manager is configured to:
   determine that a confidence level for the local result is above a threshold level; and wherein to generate the initial response before receiving the remote result, the result manager is configured to:
   in response to determining that the confidence level for the local result is above the threshold level, generate the initial response.

5. The system as recited in claim 1, wherein the result manager is configured to:
   determine a confidence level for the local result;
   determine a confidence level for the remote result; and if the confidence level for the local result is not lower than the confidence level for the remote result, determine not to correct the local result.

6. A method, comprising:
performing, by a computing device:
receiving data;
performing, by a data processing model of the computing device, one or more operations on the data to generate a local result;
sending the data to a network-based data processing service;
generating an initial response before receiving the remote result;
receiving the remote result from the remote provider network, wherein the remote result is based on performance, by a remote data processing model at the provider network, of one or more operations on the data received from the edge devices to generate an initial remote result, and wherein the remote result is smaller than the initial remote result and comprises one or more delta values based on differences between the local result and the initial remote result; and
determining, based on the remote result and the local result, whether to correct the local result to generate an additional response different than the initial response previously generated by the result manager based on the local result.

7. The method as recited in claim 6, further comprising:
determining, based on a confidence level for the local result, whether to generate the initial response before receiving the remote result.

8. The method as recited in claim 7, wherein determining whether to correct the local result comprises:
determining a confidence level for the local result;
determining a confidence level for the remote result; and
determining whether the confidence level for the local result is lower than the confidence level for the remote result.

9. The method as recited in claim 6, further comprising:
determining that a confidence level for the local result is above a threshold level; and
wherein generating the initial response before receiving the remote result comprises:
in response to determining that the confidence level for the local result is above the threshold level, generating the initial response.

10. The method as recited in claim 9, further comprising:
in response to determining to correct the local result to generate an additional response:
modifying the local result based at least on the remote result; and
generating, based on the modified local result, the additional response.

11. The method as recited in claim 6, wherein the remote result comprises an update for the data processing model of the computing device, and further comprising:
updating the local model using the update from the remote provider network.

12. The method as recited in claim 6, wherein the computing device is connected to a network, and wherein at least a portion of the data is received from one or more environmental sensors connected to the network.

13. The method as recited in claim 6, wherein the computing device connected to a local network and the network-based data processing service is a service of a remote provider network.

14. The method as recited in claim 6, wherein generating a different response comprises:
generating a command for another computing device to perform an action; and
sending the command to the other computing device.

15. A non-transitory computer-readable storage medium storing program instructions that, when executed by one or more computing devices for a data processing service of a provider network, cause the one or more computing devices to implement:
obtaining, at the data processing service, data from a computing device of a remote network;
obtaining, at the data processing service, a remote result from a remote data processing model of the computing device, wherein the remote result is based on the data;
performing, by a data processing model, one or more operations on the data to generate a result;
modifying the result of the data processing model that was generated by processing of the data, based at least on the remote result of the remote data processing model that was generated by processing of the same data at the remote network, to generate a modified result that is different than the result of the data processing model and is different than the remote result of the remote data processing model of the remote network,
wherein the modifying of the result comprises determining one or more delta values based on differences between the remote result and the result and replacing the result with the one or more delta values, and wherein the one or more delta values is smaller than the result replaced by the one or more delta values; and
transmitting the modified result from the provider network to the computing device of the remote network.

16. The non-transitory, computer-readable storage medium of claim 15, wherein the program instructions cause the one or more computing devices to further implement:
generating an update for the remote data processing model of the computing device based on the remote result and the result; and
transmitting the update to the computing device of the remote network.

17. The non-transitory, computer-readable storage medium of claim 15, wherein the program instructions cause the one or more computing devices to further implement:
modifying the result based on one or more differences between the remote result and the result.

18. The non-transitory, computer-readable storage medium of claim 15, wherein the program instructions cause the one or more computing devices to further implement:
modifying the result based on a difference between a confidence level for the remote result and a confidence level for the result.

* * * * *